United States Patent [19]
Takagi et al.

[11] Patent Number: 5,686,944
[45] Date of Patent: Nov. 11, 1997

[54] SERIAL PRINTER WITH HYBRID PRINT CONTROL OF INTERLACED AND MINUTE FEED PRINTING

[75] Inventors: Akira Takagi; Hiroaki Tojo; Shoichi Hiraide, all of Nagano, Japan

[73] Assignee: Seiko Epson Corporation, Tokyo, Japan

[21] Appl. No.: 395,834

[22] Filed: Feb. 28, 1995

[30] Foreign Application Priority Data

Mar. 2, 1994 [JP] Japan ..................................... 6-032431
Jun. 28, 1994 [JP] Japan ..................................... 6-168770

[51] Int. Cl.$^6$ ..................................... B41J 2/15; B41J 29/38
[52] U.S. Cl. ..................................... 347/41; 347/9; 347/16
[58] Field of Search ..................................... 347/41, 12, 9, 347/16, 40, 233, 224, 225

[56] References Cited

U.S. PATENT DOCUMENTS

| | | | |
|---|---|---|---|
| 4,198,642 | 4/1980 | Gamblin | 347/41 |
| 4,401,991 | 8/1983 | Martin | 347/41 |
| 4,631,548 | 12/1986 | Milbrandt | 347/43 |
| 4,737,041 | 4/1988 | Nakayama | 347/41 X |
| 4,739,415 | 4/1988 | Toyono et al. | 347/9 X |
| 4,965,593 | 10/1990 | Hickman | 347/41 |
| 5,070,345 | 12/1991 | Lahut et al. | 347/41 |
| 5,079,563 | 1/1992 | Starkweather et al. | 347/41 |
| 5,121,142 | 6/1992 | Iwazawa et al. | 347/41 |
| 5,300,950 | 4/1994 | Lopez et al. | 347/41 |

FOREIGN PATENT DOCUMENTS

| | | | |
|---|---|---|---|
| 0488406 | 6/1992 | European Pat. Off. | B41J 2/505 |
| 0532270 | 3/1993 | European Pat. Off. | B41J 2/485 |
| 0566318 | 10/1993 | European Pat. Off. | B41J 2/51 |
| 4001879 | 8/1990 | Germany | B41J 2/505 |
| 2251581 | 7/1992 | United Kingdom | 347/41 |

*Primary Examiner*—David Yockey
*Attorney, Agent, or Firm*—Sughrue, Mion, Zinn, Macpeak & Seas

[57] ABSTRACT

In an ink jet printer, a print head includes (N+1) nozzles arrayed in the paper feed direction. The distance between the adjacent nozzles is K times as long as the dot line pitch P. N and K are each an integer larger than 2, and mutually prime. The quantity of ink droplet discharged from each nozzle is adjusted so as to form on a print paper, dots each having the diameter at least 1.4 times as long as the dot line pitch. An interlaced print as the combination of a print of paths made by the N successive upper nozzles of the print head and a paper feed of N print line pitches is used for the print on the most part of the print paper. A minute-feed print as the combination of a print of paths made by the N successive upper or lower nozzles of the print head and a paper feed of one print line pitch is used for the print on the upper and lower end areas of the print paper that reject a perfect print by the interlaced print. With the combination of the interlaced print and the minute-feed print, a perfect print is made on the entire surface of the print paper.

11 Claims, 20 Drawing Sheets

FIG. 4(I)   FIG. 4(II)   FIG. 4(III)   FIG. 4(IV)   FIG. 4(V)

FIG. 5(I) FIG. 5(II) FIG. 5(III) FIG. 5(IV) FIG. 5(V) FIG. 5(VI) FIG. 5(VII) FIG. 5(VIII) FIG. 5(IX)

FIG. 10
STANDARD PRINT MODE
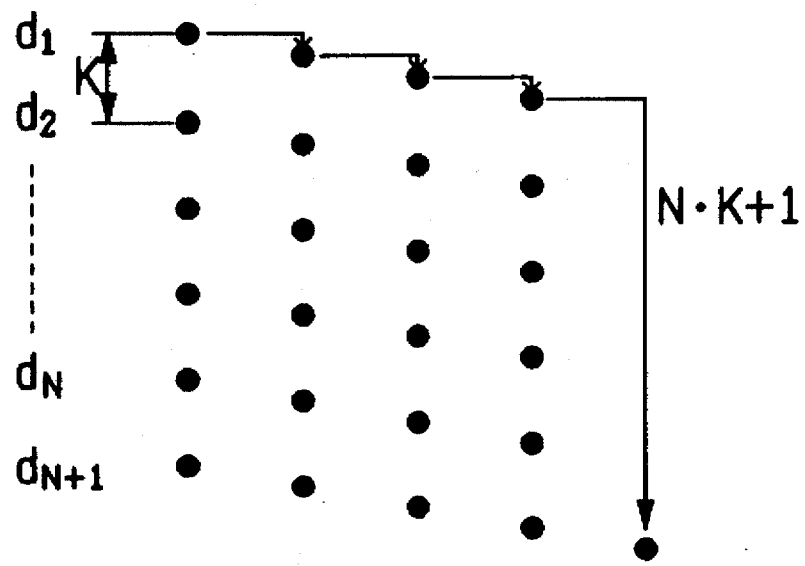
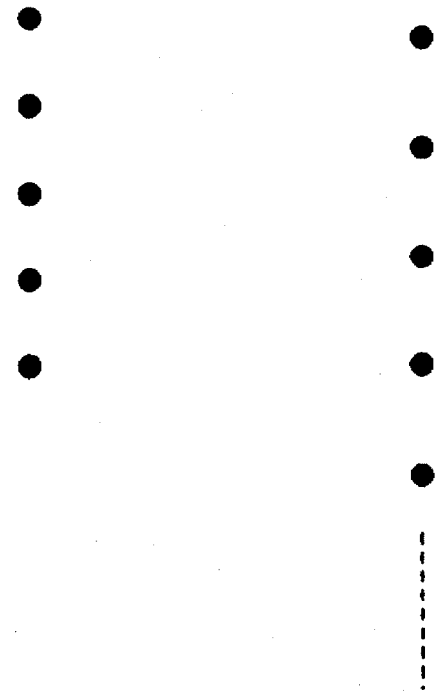

HYBRID PRINT MODE

⊗ PRINTING ELEMENT NOT USED

SERIAL PRINTER WITH HYBRID PRINT CONTROL OF INTERLACED AND MINUTE FEED PRINTING

BACKGROUND OF THE INVENTION

The present invention relates to a serial printer for executing an interlaced print scheme by using a print head having a plural number of print elements arrayed in the paper feed direction at a pitche plural times as long as the width of a print line. More particularly, the invention relates to a printer suitable for an ink jet printer.

In the serial printer, for the improvement of picture quality of printed graphic data, there is known the ink jet printer with an interlaced print scheme as disclosed in U.S. Pat. No. 4,198,642. In this ink jet printer, N ink jets arranged at an interval K times as long as one dot line width are formed by the print head. After the print of one path ends, a print paper is fed by a distance N times as long as the one dot line width. Subsequently, the next path is printed in a state that it overlaps with the area printed by the previous path.

The interlaced print scheme is capable of providing a high density print independently of the distance between the ink jets. However, if control fails to set the quantity of paper feed to be exactly N times one dot line width, the dot-to-dot distances are not uniform. Thus, the resultant print inevitably suffers from a streak space, or a white line. This deteriorates the print quality.

This problem is serious particularly in the high density print of 720 dpi.

A mechanism for controlling the paper feed extremely accurately may be used for solving the problem. However, this mechanism is very expensive, and cannot cope with a variation of an expansion rate of the print paper under print by ink, ambient humidity, and the like, and paper feed errors owing to expansion of the paper feed mechanism by temperature.

Further, when the interlaced print scheme is employed, an area that rejects a perfect print or a print of all the dot lines (where not all the dot lines are printed) is inevitably contained in both the head area and the foot area.

When K=4 and N=5, the area of 12 dot lines in each of the head area and the foot area rejects a perfect print by the interlaced print.

To cope with this problem, there is adopted a method by which the start position and the end position of the print head is shifted forward or backward relative to the print paper by a distance of the width of the print reject area.

However, this method requires a complicated mechanism which allows the lead-edge hold member, which prevents the print paper from rising, to move in such a manner that it does not collide with the print head.

SUMMARY OF THE INVENTION

Accordingly, a first object of the present invention is to provide a serial printer with the interlaced print scheme which completely eliminates the white lines caused by the paper feed error, thereby improving a print quality.

A second object of the present invention is to provide a serial printer with the interlaced print scheme which can make a perfect successive print on the head area and the foot area of a print paper, thereby improving the print quality over the entire print.

According to one aspect of the present invention, there is provided a serial printer for carrying out a print on a print medium by moving a print head above the print medium alternately in a main scan direction and a sub-scan direction, the serial printer being constructed as follows. In the serial printer, the print head includes N dot forming elements arrayed in the sub-scan direction (N: integer larger than 2). The distance between the adjacent dot forming elements is K times as long as the dot line pitch (K and N are mutually prime). The distance of the sub-scan is adjusted to be N times as long as the dot line pitch. The dot forming elements are arranged so as to form on the print medium, dots each having the diameter at least 1.4 times as long as the dot line pitch.

In this printer, the adjacent printed dot lines overlap with each other by about 20% at the respective upper and lower portions. Thus, even if such a paper feed error as to be absorbed by the overlapping area, is caused, no white line is produced between the adjacent dot lines. Further, slight differences of the overlapping areas are distributed over the entire area of the image. The visual capacity of the human being hardly distinguishes those different overlapping areas. Accordingly, the overlapping area difference does not deteriorate the quality of a picture image.

According to a second aspect of the present invention, there is provided a serial printer for carrying out a print on a print medium by moving a print head above the print medium alternately in the main scan direction and the sub-scan direction, the serial printer being constructed as follows. In the serial printer, assuming that N and K are mutually prime and each an integer larger than 2, and N>K, the print head includes (N+1) dot forming elements arrayed in the sub-scan direction, and the distance between the adjacent dot forming elements is K times as long as the dot line pitch. The serial printer includes hybrid print control means for controlling the operations of the main scan, the sub-scan, and the operation of the dot forming elements, so as to selectively carry out a minute-feed print or an interlaced print. The hybrid print control means selects the interlaced print for a body area of the print medium which accepts a perfect print by the interlaced print, and selects the minute-feed print for a head area and a foot area of the print medium which reject a perfect print by the interlaced print. The term "minute-feed print" means a print operation in which the sub-scan of one dot line pitch is conducted after the scanning operation of the main scan is completed.

In this serial printer, the minute-feed print is used for the head area and the foot area that reject a perfect print by the interlaced print. Those areas are contained in the upper and lower end portions of the print medium or paper. Accordingly, this printer is free from the print reject areas in the upper and lower end portions of the print paper as the problem of the interlaced print. Further, since the interlaced print is used for the print for the body area occupying the most part of the print paper, high quality print is secured over the entire area of the print. Thus, in the printer of the invention employing the hybrid print as the combination of the minute-feed print and the interlaced print, the printer can make a print over the substantially entire area of the print medium, and ensures a high quality print.

In the serial printer, when the minute-feed print is conducted for the head area, and the interlaced print is conducted for the body area, N successive dot forming elements of the (N+1) dot forming elements are preferably used. Accordingly, the paper feed quantity is one line pitch in the minute-feed print, and is N line pitches in the interlaced print. If all the (N+1) dot forming elements are used for the head area in the minute-feed print, when the print mode is shifted from the minute-feed print to the interlaced print, the sub-scan of a third feed quantity must be carried out.

In the serial printer, when the minute-feed print is conducted for the head area, and the interlaced print is conducted for the body area, the N upper dot forming elements are used. When the minute-feed print is conducted for the foot area, the N successive lower dot forming elements or all the (N+1) dot forming elements are used. With this construction, the print area in the hybrid print perfectly coincides with the print area in the standard print (conventional general print system using both the sub-scan of one line pitch and the sub-scan of {K×(N−1)+1} pitches). In other words, the print start position in the upper end portion of the print medium and the print end position thereof may be set to the uppermost position and the lowermost position, respectively, under mechanical restrictions for the positional relationship between the print head and the print medium. Accordingly, in the printer constructed such that the standard print mode and the hybrid print mode are selectively used, the print area by the standard print mode may be made perfectly coincident with that by the hybrid print mode. Therefore, any special complexity is not introduced into the related mechanism.

As for the information processing in the hybrid print mode, check a is made as to if print data is present for the head area and the foot area of the print medium. If no print data is present for the head area, the minute-feed print for this area is omitted. If no print data is present for the foot area, the minute-feed print for this area is omitted. With this feature, when the minute-feed print is not required, only the interlaced print is carried out, thereby improving a print speed.

Some varieties may be employed in the hybrid print mode. The first is to apply the minute-feed print to all the lines in the head area and the foot area, and to apply the interlaced print to all the lines within the body area. The second is to apply the interlaced print to not only all the lines in the body area but also the lines in the head area and the foot area that can be printed by the interlaced print, and to apply the minute-feed print to only the remaining lines that cannot be printed by the interlaced print.

When comparing these hybrid print modes, the information processing procedures of the first hybrid print mode is simpler than those of the second hybrid print mode. However, the print quality by the second hybrid print mode is superior to that by the first hybrid print mode since the second hybrid print mode fully utilizes the interlaced print.

In either of the first and second hybrid print modes, when one of the minute-feed print and the interlaced print is used, it is preferable to apply NULL data to the dot forming elements located at the positions of the lines that can be printed by both the minute-feed print and the interlaced print. If so done, the overlapping print can be prevented.

In this case, it is preferable that in the minute-feed print, the NULL data is generated, and in the interlaced print, generation of the NULL data is suppressed. By so doing, the interlaced print is preferentially used, improving the print quality.

BRIEF DESCRIPTION OF THE DRAWINGS

FIG. 4 sections 4(I) thru 4(V) are explanatory diagrams useful in explaining a printing operation of the first embodiment when the resolution is 360 dpi;

FIG. 5 sections 5(I) thru 5(IX) are explanatory diagrams useful in explaining a printing operation of the first embodiment when the resolution is 720 dpi;

FIG. 10 is a diagram for explaining the basic operation of a standard print mode of the second embodiment;

DETAILED DESCRIPTION OF THE PREFERRED EMBODIMENTS

Figure 1:
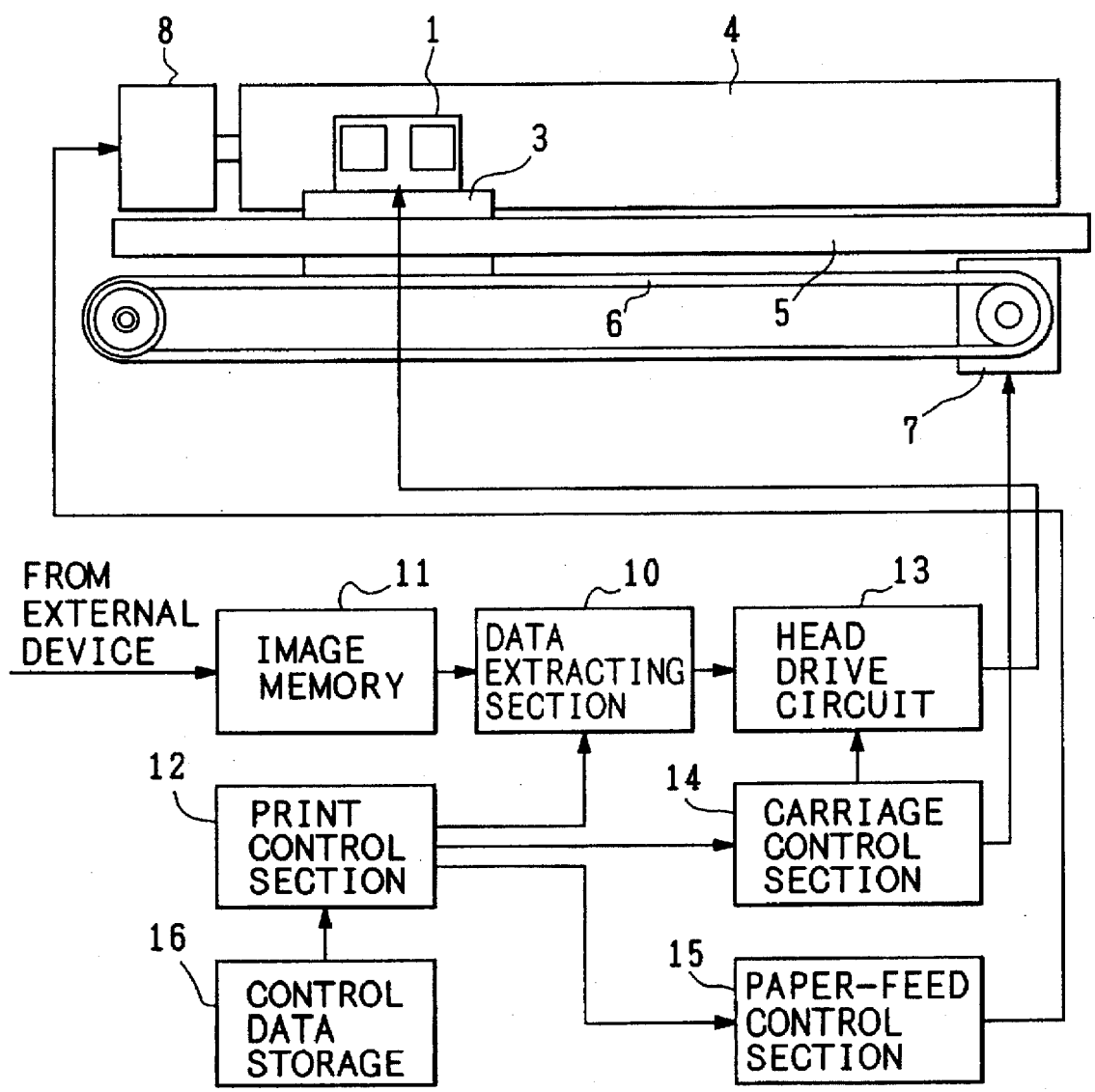
FIG. 1 is a view showing the construction of a key portion of an ink jet printer according to a first embodiment of the present invention.

FIG. 1 is a diagram showing the construction of an ink jet printer according to a first embodiment of the present invention. In the figure, reference numeral 1 designates a print head constructed such that a piezoelectric vibrator as a drive source presses a pressure generating chamber containing ink therein to forcibly discharge ink droplets therefrom. In the print head of the ink jet type using the piezoelectric vibrator, the volume of an ink droplet discharged from the nozzle may be adjusted by changing the amplitude of a drive signal applied to the piezoelectric vibrator and the timing to apply the drive signal. By positively utilizing this characteristic, it is easy to control the diameter of a dot to be printed on a print paper or the thickness of a dot line to be printed thereon. The dot diameter and the dot line thickness may also be adjusted by changing a print paper to another print paper of ink infiltration different from that of the former even if the same volume of the ink droplet is used.

The print head 1, firmly mounted on a carriage 3, is moved in the direction parallel to the shaft of a platen 4, by means of a carriage motor 7. This movement of the print head 1 is referred to as "main scan". After the completion of the main scan, the platen 4 is turned by a paper feed motor 8, so that a print paper is moved a predetermined distance in the direction orthogonal to the direction of the main scan. The movement of the print paper is referred to as "paper feed". The movement of the print head 1 relative to the print paper when the print paper is moved, is called "sub-scan".

The print head 1 includes a plural number of ink jet nozzles arrayed in the sub-scan direction. During each main scan, a plural number of ink jets are shot forth toward a print paper on the platen 4 from those nozzles, to thereby form a plural number of dot lines. The plural number of dot lines formed through one main scan are referred to as "path".

Figure 2:
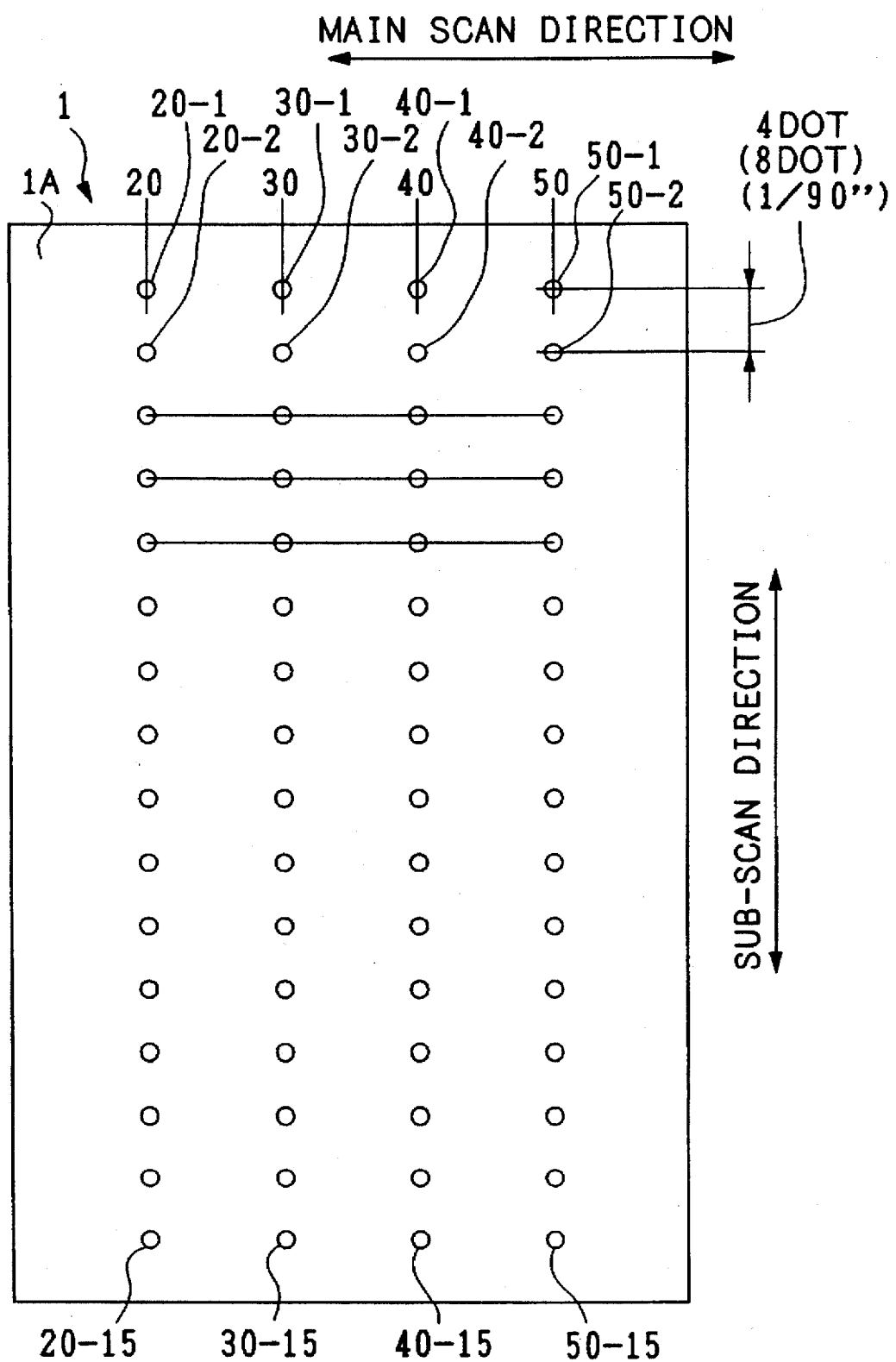
FIG. 2 is a front view showing arrays of nozzles of a print head used in the embodiment.

FIG. 2 is a diagram showing an array of ink jet nozzles of the print head 1 when viewed from the front of a nozzle plate 1A. As shown, four linear nozzle arrays 20, 30, 40, and 50 are arranged in the main scan direction on the nozzle plate 1A. These linear nozzle arrays 20, 30, 40, and 50 are supplied with ink of four colors, black, cyan, yellow, and magenta, from an ink tank, not shown. Each linear nozzle array consists of 15 ink jet nozzles linearly arrayed in the sub-scan direction. Numerals, connected by hyphen, are attached to each nozzle. Of these numerals, the numeral on the left side of the hyphen indicates an array number, and the numeral on the right side thereof indicates a nozzle number. In those linear nozzle arrays 20, 30, 40, and 50, four nozzles designated by the same numerals are also linearly arrayed in the main scan direction.

In each linear nozzle array, the distance between the adjacent nozzles as viewed in the sub-scan direction is set at 1/360×4 (inch)=1/90 (inch). The distance is integer times as long as the pitch of the dot lines to be formed on the print paper. As will be described later, the printer under discussion is operable at one of two resolutions, 360 dpi and 720 dpi. In the resolution of 360 dpi, the pitch of the dot line is 1/360 (inch), and in the resolution of 720 dpi, the pitch of the dot line is 1/720 (inch). Accordingly, the distance of 1/90 (inch) is four times as long as the dot line pitch in the case of 360 dpi, and is eight times as long as the dot line pitch in the case of 720 dpi. The distance of the adjacent linear nozzle arrays as viewed in the main scan direction is set at 1/720×128 (inch), for example.

It is noted here that assuming that the number of nozzles is N, and the distance between the nozzles is expressed by a multiple K of the dot line pitch, N is an integer of 2 or larger and N is prime to K. As already mentioned, N=15 and K=4 or 8 in this embodiment.

Referring again to FIG. 1, the carriage 3 is reciprocatively coupled with a guide member 5 provided in parallel with the axis of the guide member 5. The carriage 3, which is coupled with the carriage motor 7 through a timing belt 6, is driven by the motor 7 to run at a predetermined speed.

The paper feed motor 8, coupled with the platen 4, feeds a print paper by a unit of 1/360 (inch)×15 (inch) in a print mode of 360 dpi and by a unit of 1/720 (inch)×15 (inch) in a print mode of 720 dpi, under control of a paper-feed control section 15 to be described later. The unit of the paper feed is determined by "dot line pitch"×"the number N of the nozzles".

A data extracting section 10 operates in response to commands from a print control section 12 to be described later to extract data about the nozzles 20-1, 20-2, 20-3, ..., 20-15, ..., 50-1, 50-2, 50-3, ..., 50-15 of the linear nozzle arrays 20, 30, 40, and 50, and produces output signals for transfer to a head drive circuit 13. In the case of 360 dpi, the nozzle-to-nozzle distance of each linear nozzle array is four times as long as the dot line pitch. Accordingly, data is extracted every four lines. In the case of 720 dpi, the nozzle-to-nozzle distance of each linear nozzle array is eight times as long as the dot line pitch. Accordingly, data is extracted every eight lines.

The head drive circuit 13 has a function to adjust the diameter of each of the dots, which are formed on the print paper at the resolution designated by the print control section 12, depending on the volume of each ink droplet discharged from the nozzles. The volume of the ink droplet is adjusted by adjusting the amplitude of a drive signal applied to the piezoelectric vibrator or by adjusting the timing of operation at which ink is absorbed into the pressure chamber by expanding the pressure chamber and the pressure generating chamber is compressed to discharge ink droplets. With the dot diameter adjusting function, the dot diameter is adjusted to be 100 to 120 μm in the case of 360 dpi, and to be 50 to 60 μm in the case of 720 dpi.

The print control section 12 counts the quantity of movement of the print head 1 in accordance with a signal from a carriage control section 14, and produces a print timing signal every time the quantity of movement of the print head 1 reaches 1/360 (inch) or 1/720 (inch) in accordance with the previously selected resolution, 360 dpi or 720 dpi. Every time the print of one path is completed, the print control section 12 directs the paper-feed control section 15 to feed a print paper the distance of 1/360×15 (inch) when the resolution of 360 dpi is selected, and the distance of 1/720×15 (inch) when the resolution of 720 dpi is selected.

Figure 3A:
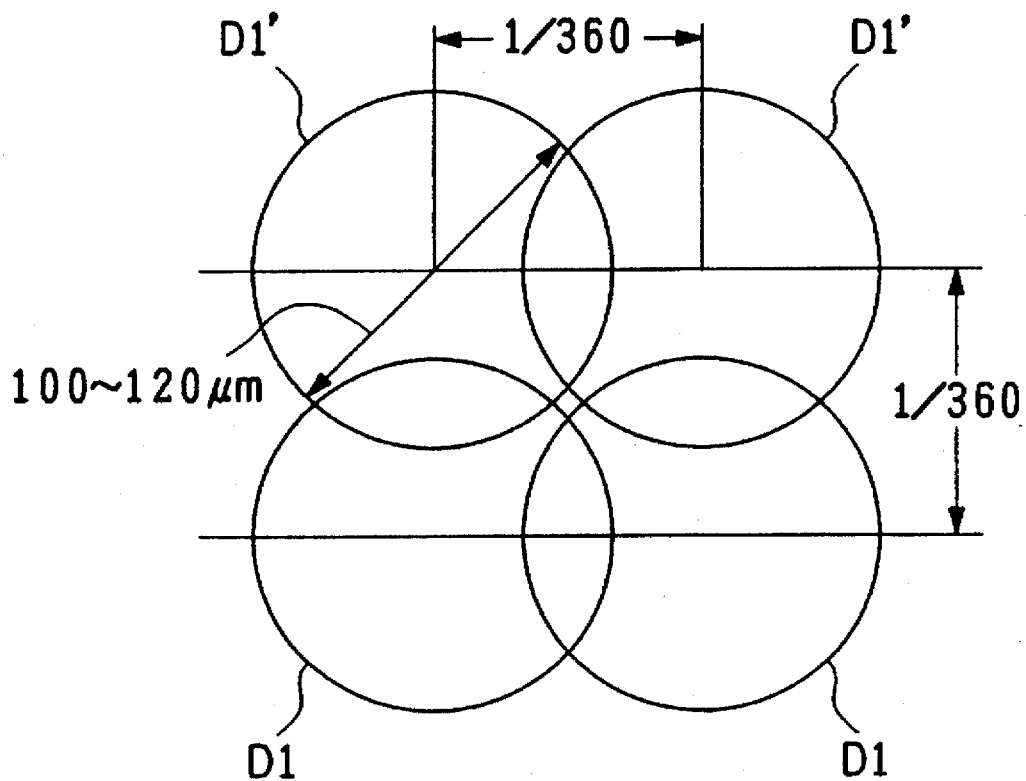
FIGS. 3A and 3B are diagrams showing the relationship of the size of dots formed on a print paper and the pitch of dots in the first embodiment, FIG. 3A showing the relationship when the resolution is 360 dpi, and FIG. 3B showing the relationship when the resolution is 720 dpi.
Figure 3B:
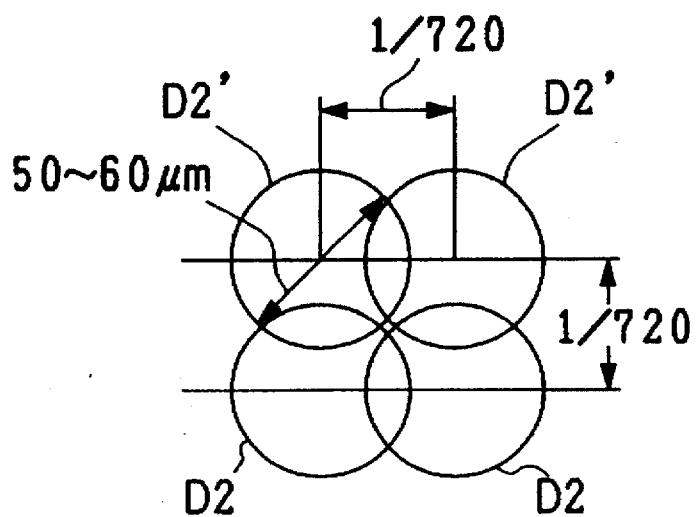

FIGS. 3A and 3B are diagrams showing two examples of the arrays of dots formed on a print paper. FIG. 3A shows the array of dots when printed at 360 dpi, and FIG. 3B, the array of dots when printed at 720 dpi. In the case of the resolution of 360 dpi, the pitch of the dots is 1/360 (inch) in both the main and sub-scan directions. The diameter of the dot is adjusted to be a value at least 1.4 times as long as 1/360 (inch) of the pitch, e.g., 100 to 120 μm. In the case of the resolution of 720 dpi, the pitch of the dots is 1/720 (inch) in both the main and sub-scan directions. The diameter of the dot is adjusted to be a value at least 1.4 times as long as 1/720 (inch) of the pitch, e.g., 50 to 60 μm. Accordingly, in either case, the dots adjacent to each other as viewed in the sub-scan direction overlap with each other in their areas each of approximately 20% of the dot diameter. The same thing is true for the dots adjacent to each other as viewed in the main scan direction. Therefore, even if the quality of the paper feed varies to some extent, this slight variation of the paper feed quantity is absorbed by the overlapping portion. Accordingly, the adjacent dot lines closely contact with each other. In other words, any space line is not formed between the adjacent dot lines.

The ink jet printer thus constructed will be described with reference to FIG. 4.

The four linear nozzle arrays 20, 30, 40, and 50 of the print head 1 are supplied with ink of black, cyan, yellow, and magenta and controlled so as to shoot forth ink droplets of those colors at a point on the print paper. The operation of one nozzle is correspondingly applied to the operations of the remaining nozzles. Accordingly, the operation of the nozzle array 20 will typically be described.

[Print at 360 dpi]

When the resolution of 360 dpi is selected, the print control section 12 produces a print timing signal every time the carriage 2 moves 1/360 (inch) in accordance with the data that is stored in a control data storage 16. Further, the print control section 12 selects a control mode to set the quantity of one paper feed to 1/360×15 (inch), for the paper-feed control section 15.

The data extracting section 10 extracts data of the 1st, 5th, 9th, ... 57th lines to be depicted with the nozzles 20-1, 20-2, 20-3, ..., 20-15, from an image memory 11, and transfers the data to the head drive circuit 13.

Under this condition, every time the print head 1 is moved 1/360 (inch) in the main scan direction, the nozzles 20-1, 20-2, 20-3, ..., 20-15 discharge ink droplets. At this time, the dots adjacent to each other as viewed in the main scan direction overlap as shown in FIG. 3A, to form one dot line. As a result, a path consisting of a total of 15 lines, or the 1st, 5th, 9th, ... 57th lines, as shown in FIG. 4(I), is printed on the print paper.

When the print of the first path is completed, the paper-feed control section 15 then drives the paper feed motor 8 to feed forward the print paper a short distance of 1/360×15 (inch). As a result, the top nozzle 20-1 is positioned at the 16th line, or the line located above the 5th line (denoted as the line number 17) of the path previously printed.

In this state, the data extracting section 10 extracts data of the 16th, 20th, 24th, ... 72th lines from the image storage 11, and transfers the data for the nozzles 20-1, 20-2, 20-3, ..., 20-15, as in the previous manner. Then, every time the print head 1 is moved 1/360 (inch), those nozzles shoot forth ink droplets, to thereby print a second path consisting of the 16th, 20th, 24th, ... 72th lines as shown in FIG. 4(II).

The lines of the second path, respectively, overlap with their adjacent lines of the first path in the areas of approximately 20% of the dot diameter as shown in FIG. 3A.

Figures 4, 4I, 4V:
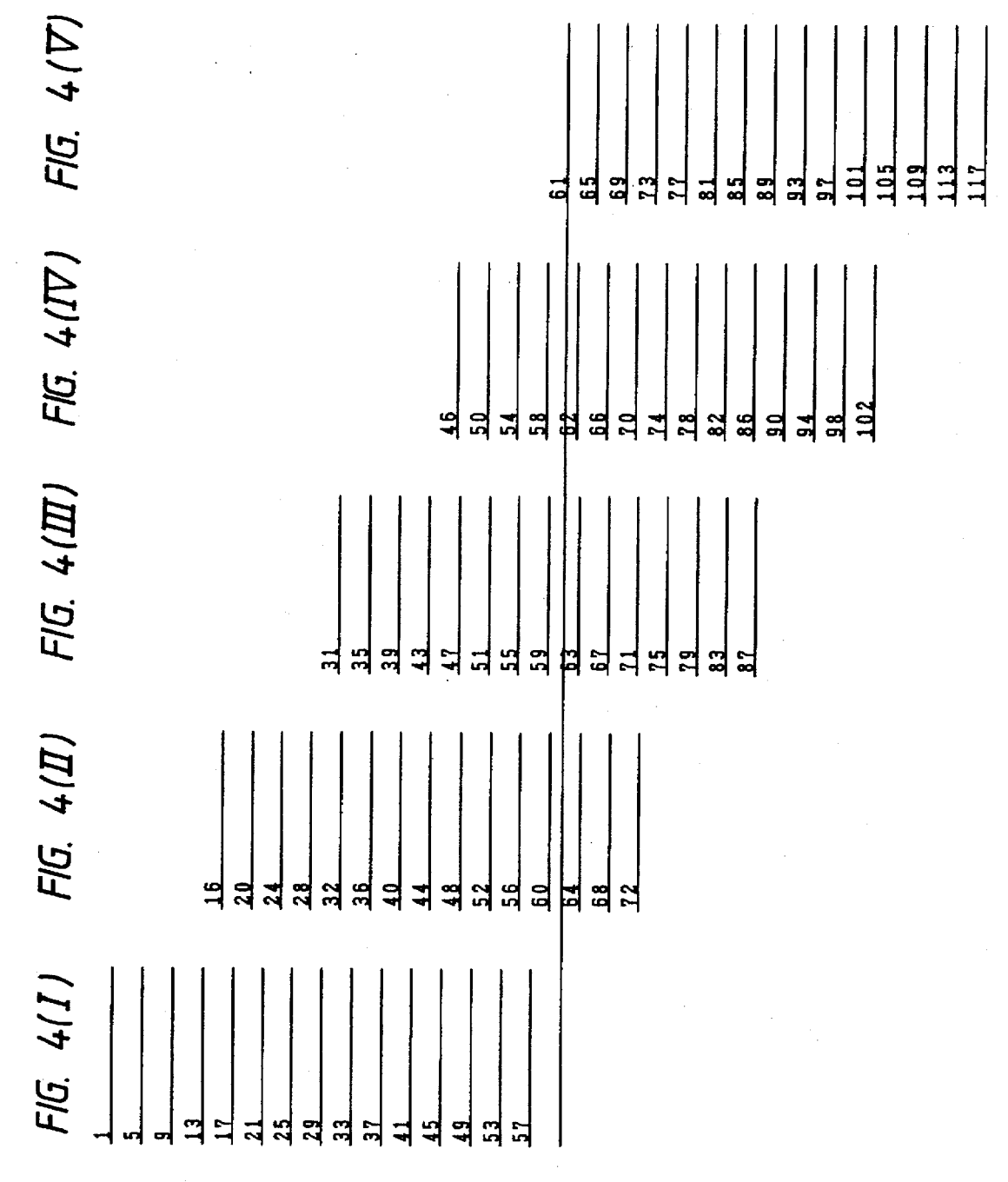

When the print of the second path is completed, the print paper is fed 1/360×15 (inch), and a third path consisting of the 31st, 35th, 39th, ..., 87th lines as shown in FIG. 4(III) is then printed. Thereafter, a fourth path consisting of the 46th, 50th, 54th, ..., 98th, and 102nd lines as shown in FIG. 4(IV) is printed.

Subsequently, a fifth path as shown in FIG. 4(V) is printed. The top line of the fifth path is the 61st line and lies at the position separated four lines downward from the 57th line as the bottom line of the first path. The subsequent print operations are successively carried out as in the previous print operation. In the interlaced printing method as mentioned above, in the printed area formed by lines subsequent to the line of {(N−1)×(K−1)+1}, i.e., the 43rd line, all the lines are printed, thereby presenting a perfect print result. However, in the printed area ranging from the 1st line to the line of {(N−1)×(K−1)}, i.e., the 42nd line, only some of the lines are printed. This printed area is imperfect and unsuitable for practical use. In one of the solutions to this problem, the start position of the print head 1 is displaced relative to a print paper a distance corresponding to the distance from the 1st line to the 42nd line, and null data is applied to the nozzles located for this offset area. By so doing, a perfect print continues from the top on the print paper to the subsequent area thereon.

Figure 6A:
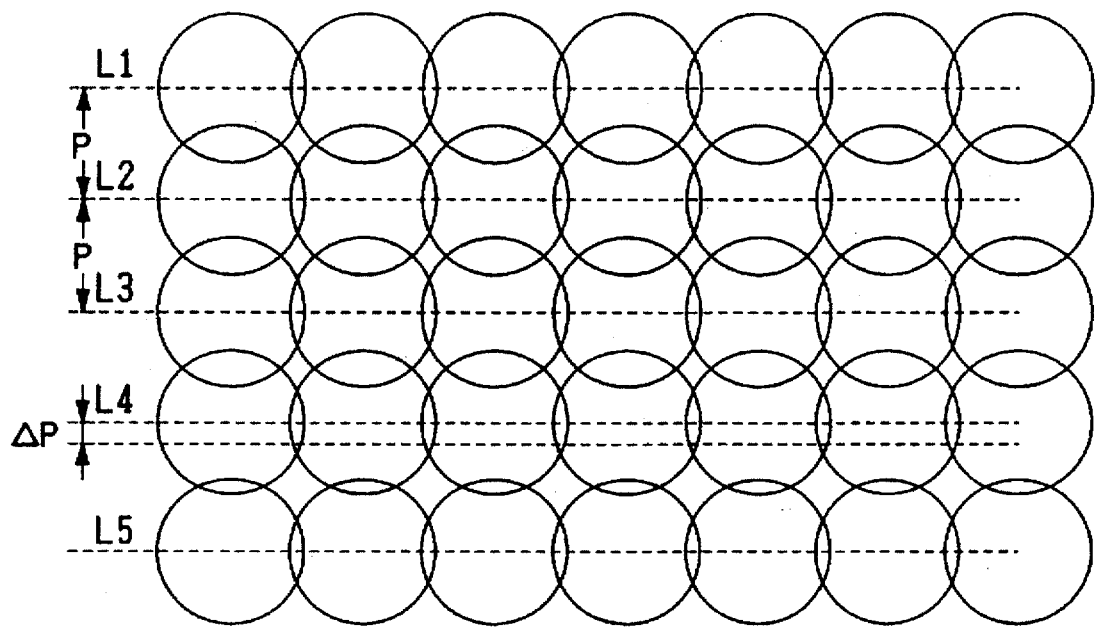
FIG. 6A is a diagram showing successive printed lines by the first embodiment.

As stated above, in the continuously printed area, the adjacent dots overlap with each other in the areas of approximately 20% of the dot diameter. Accordingly, if the paper feed is precisely carried out, the adjacent lines uniformly overlap as of the lines L1 to L3 shown in FIG. 6A, thereby forming an image of high quality. In a case where the line L4 is printed in a state that the paper feed suffers from an error of ±ΔP, as shown by the lines L3 to L5 in FIG. 6A, the overlapping area of the adjacent lines L3 and L4 is not equal to that of the lines L4 and L5. However, the difference of the overlapping areas fails to form a space therebetween. Further, the different overlapping areas are distributed over the entire area of the image. The visual capacity of the human being hardly distinguishes those different overlapping areas from the remaining normal overlapping areas than when the overlapping areas are localized on the image. Accordingly, this type of the overlapping area difference does not deteriorate the printing quality of the entire image.

Figure 6B:
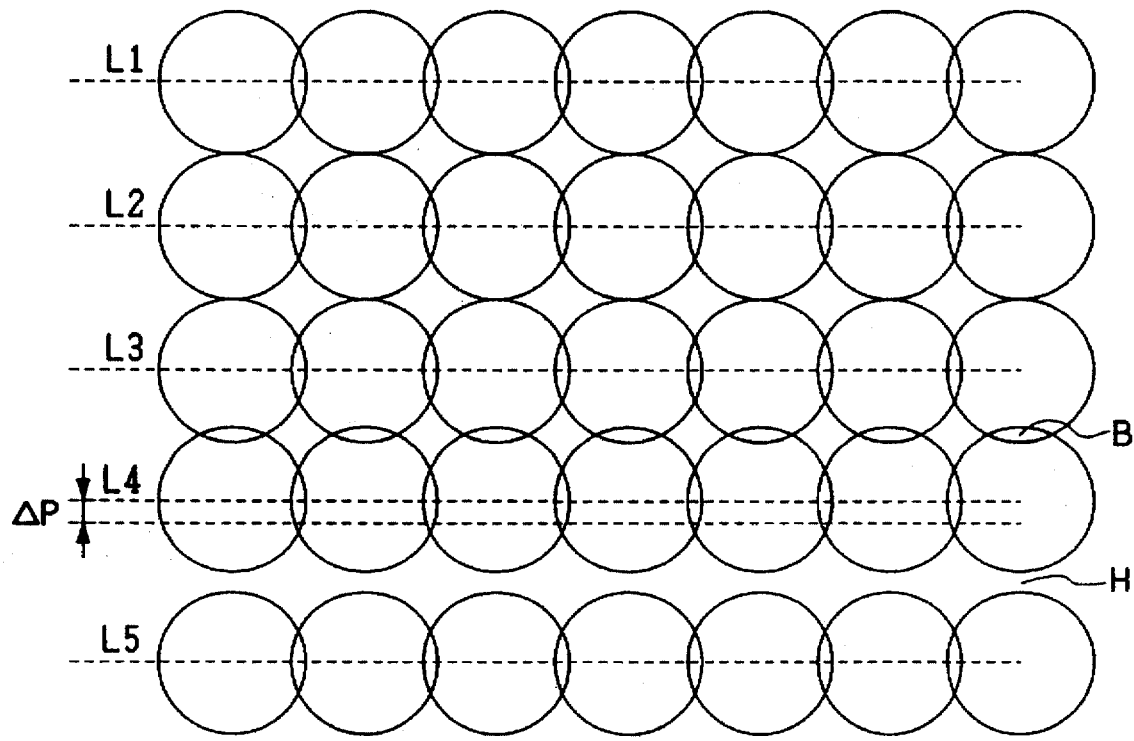
FIG. 6B is a diagram showing successive printed lines by a conventional ink jet printer.

In the conventional ink jet printer of the type in which the pitch of the dot lines is substantially equal to the diameter of the dot, in a case where the line L4 is printed in a state that the paper feed suffers from an error of ΔP, as shown by the lines L3 to L5 in FIG. 6B, an overlapping line B of high density is formed between the line L4 and the line L3 adjacent thereto, while a space line H is formed between the line L4 and another adjacent line L5. The dense line B of high density and the white line H are located extremely close to each other. The dense line B and the white line H closely located provide a high contrast and are marked to the eyes of the human being. This results in deterioration of the picture quality.

[Print at 720 dpi]

In the print at the high resolution of 720 dpi, the diameter of the dot is reduced ½ as large as that of the dot in the print at the normal resolution of 360 dpi. The reduction of the dot size may be carried out by decreasing the quantity of the ink droplets discharged from the nozzles or using a paper of less filtration or spread.

The print control section 12 selects a control mode to set to 1/720×15 (inch) the quantity of the paper feed after the print of one path is completed, in accordance with the data that is stored in a control data storage 15.

Figures 5, 5I, 5V:
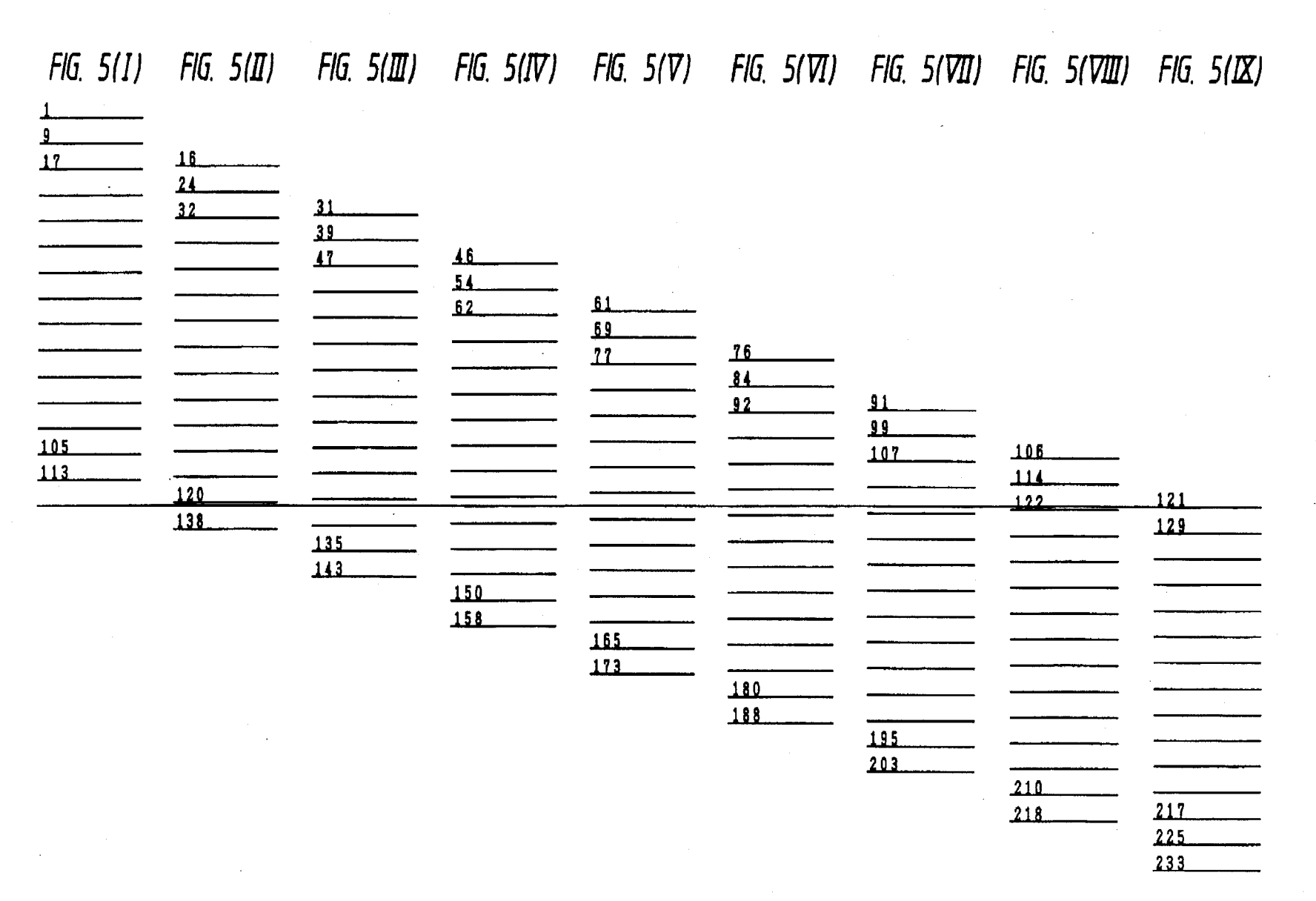

The data extracting section 10 extracts data of the 1st, 5th, 9th, 17th, ... 113th lines to be depicted with the nozzles 20-1, 20-2, 20-3, ..., 20-15, from the bit map data stored in an image memory 11, and transfers the data to the head drive circuit 13. The nozzles 20-1, 20-2, 20-3, ..., 20-15 print a path consisting of the 1st, 5th, 9th, 17th, ... 113th lines as shown in FIG. 5(I), in accordance with print timing signals derived from the carriage control section 14.

When the print of the first path is completed, the paper-feed control section 15 feeds forward the print paper by a distance of 1/720×15 (inch).

As a result, the top nozzle 20-1 is positioned at the 16th line, or the line located above the 3rd line (denoted as the 17th line) of the first path. In this state, the data necessary for printing a second path is extracted from the data extracting section 10, and transferred to the print head 1, which in turn prints a second path consisting of the 16th, 24th, 32nd, ..., 128th lines by the nozzles 20-1, 20-2, 20-3, ..., 20-15 thereof. The lines of the second path overlap with their adjacent lines of the first path in the areas of approximately 20% of the dot diameter.

In this way, the print of one path and the paper feed of 1/720×15 (inch) are repeated alternately.

When the paper feed is repeated eight times, the top nozzle 20-1 is positioned on the 121st line as shown in FIG. 5(IX). Then, the operations as shown in FIGS. 5(I) to 5(VIII) are performed.

In this high resolution print operation, the distance between the adjacent nozzles, expressed in terms of the number of dot line pitches, is two times as long as that in the normal resolution print operation. The physical quantity of paper feed is ½ as large as that in the normal resolution print operation. The twofold paper feeds, viz., eight paper feeds, form one period of the repeating operation. Therefore, the number of lines printed adjacent to the previously printed lines increases before and after each paper feed. As a result, the streaks caused by the paper feed error are dispersed further widely. This contributes to keeping the resultant print at high quality.

While the nozzle-to-nozzle distance is four times and eight times as long as the dot line pitch in the above-mentioned embodiment, the present invention may be applied to a printer in which the nozzle-to-nozzle distance is longer than in the embodiment, e.g., 8 times or 16 times.

In the embodiment described above, the color printer is discussed having four linear nozzle arrays arranged in the main scan direction. It is evident that the present invention is applicable to a monocolor printer having a single nozzle array or another color printer having a plural number of nozzle arrays arranged in the sub-scan direction.

In the above-mentioned embodiment, the start position of the print head 1 is displaced relative to a print paper by the distance corresponding to the imperfect print area caused by the interlaced printing operation, in order to remove the imperfect print area. However, to prevent the print head 1 from abutting a member for holding the lead edge of the print paper, this method requires a complicated mechanism which allows the lead-edge hold member to move.

The second and third embodiments of the present invention to be described hereinafter are constructed such that a perfect print is formed on the entire surface of a print paper without displacing the start position of the print head from the print paper by modifying the print head 1. Also in those embodiments, the dot diameter is preferably selected to be at least 1.4 times as long as the pitch of the dot lines.

Figure 7:
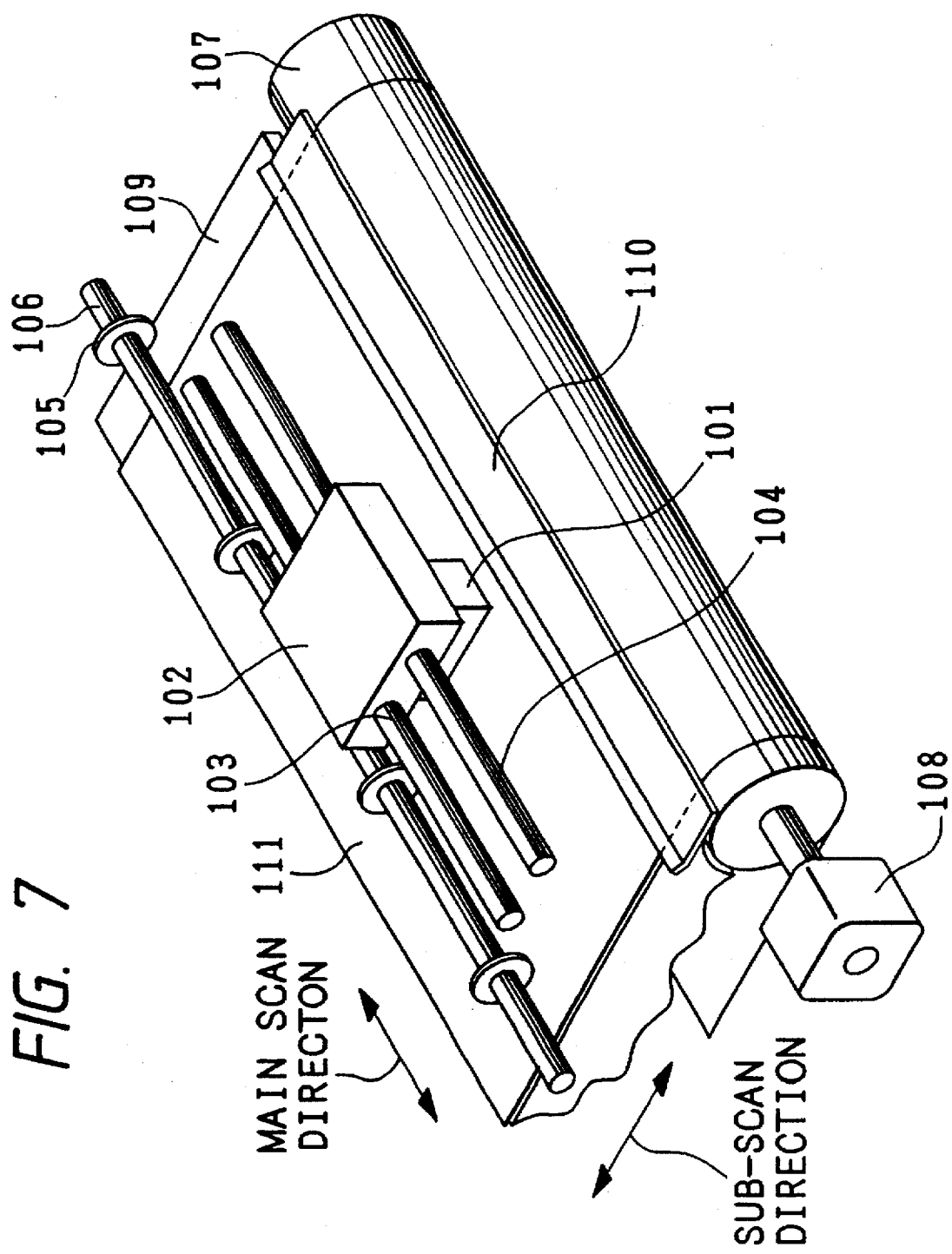
FIG. 7 is a perspective view showing the construction of a key portion of an ink jet printer according to a second embodiment of the present invention.

FIG. 7 is a view showing the construction of an ink jet printer according to the second embodiment of the present invention. A print head 101, mounted on a carriage 102, is slid on carriage guides 103 and 104. Through the sliding motion, the print head scans a print paper 111 in the main scan direction, thereby making a print on the paper. A feed roller 107 is driven by a motor 108. The print paper 111 is wound on the feed roller 107, transported onto a platen 109 while being guided by a guide plate 110, and fed in the sub-scan direction by the motor 108. A lead-edge hold roller 105 rotates about a shaft 106 with the movement of the print paper 111, while in contact with the surface of the print paper 111.

Figure 8:
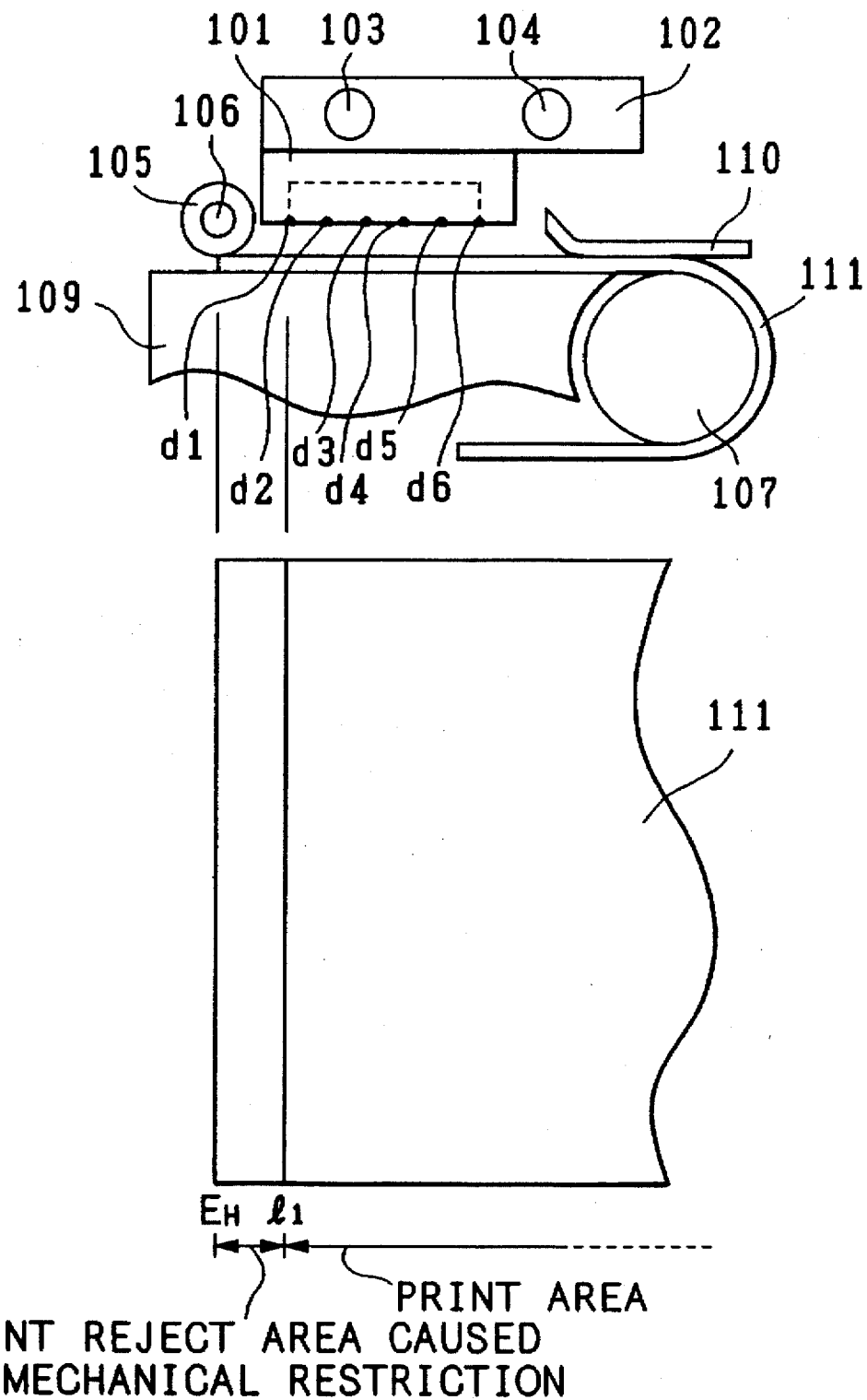
FIG. 8 is a side view showing the positional relationship of a print head of the second embodiment and the leading end of a print medium.

FIG. 8 is a diagram showing the upper end of a print area on the print paper 111 in the second embodiment, and showing the relationship between the leading end of the paper and the related mechanical portions of the printer when the paper is loaded to the printer, before a printing operation starts.

The print paper 111 wound on the feed roller 107 is transported onto the platen 109, and stopped at a position where the leading edge of the paper comes in contact with the lead-edge hold roller 105. Here, the loading operation of the paper to the printer ends.

The lead-edge hold roller 105 and the guide plate 110 prevent the print paper 111 from rising. With the aid of these members, a printed area on the platen 109 is kept flat. Provision of the members eliminates the rise of the print paper 111 and the formation of irregularity of the paper surface, which otherwise would be caused by ink sticking to the paper surface during the printing operation where the nozzles d1 to d6 jet ink, so that uniform print quality is assured.

The nozzles d1 to d6 are arrayed in one line in the sub-scan direction on the print head 101.

The position of the front nozzle d1 on the print head 101 determines the position (line l1) of the upper end of the print area on the print paper 111. The area ranging from the upper edge EH of the print paper to a position preceding to the line l1 is a print reject area caused by mechanical restrictions, such as the radius of the lead-edge hold roller 105 and a distance from the upper edge of the print head 101 to the nozzle d1.

Figure 9:
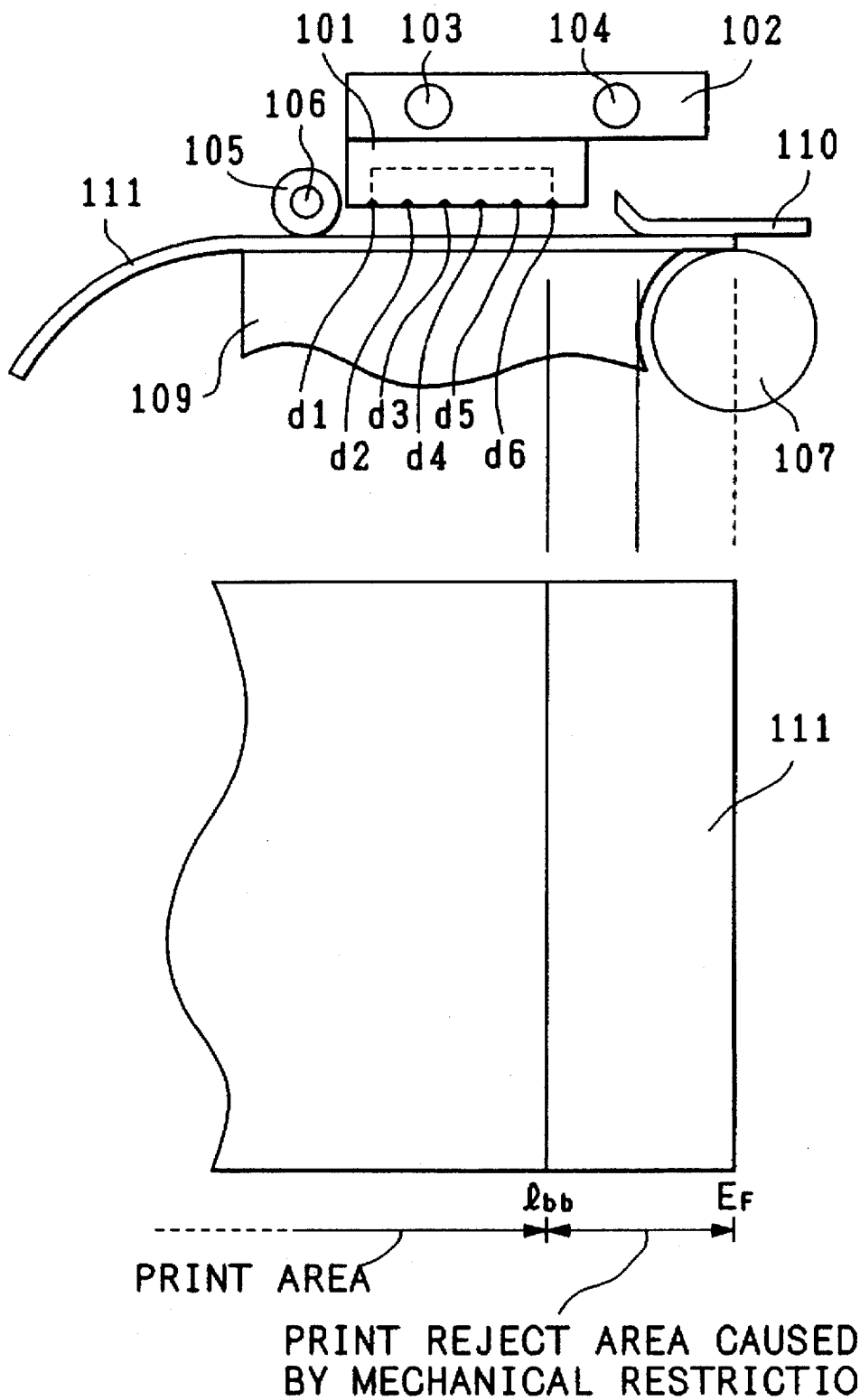
FIG. 9 is a side view showing the positional relationship of the print head of the second embodiment and the trailing end of a print medium.

FIG. 9 is a diagram showing the lower end of a print area on the print paper 111 in the second embodiment, and showing the relationship between the trailing end of the paper and the related mechanical portions of the printer when the final printing operation ends.

The print paper 111, wound on the feed roller 107, is fed onto the platen 109, and stopped when the trailing edge of the print paper comes in contact with the feed roller 107. Here, the printing operation ends.

Here, the lead-edge hold roller 105 and the guide plate 110 prevent the printed area of the paper from rising due to hanging of the printed paper 111.

At this time, the position of the last nozzle d6 on the print head 101 determines the position (line lbb) of the lower end of the print area on the print paper 111. An area ranging from the position succeeding to the line lbb to the lower edge EH of the print paper is a print reject area, caused by mechanical restrictions, such as the radius of the feed roller 107 and a distance from the lower edge of the print head 101 to the nozzle d6.

An area ranging from the line l1 to the line lbb on the print paper 111 is a print area as shown in FIGS. 8 and 9.

Figure 11:
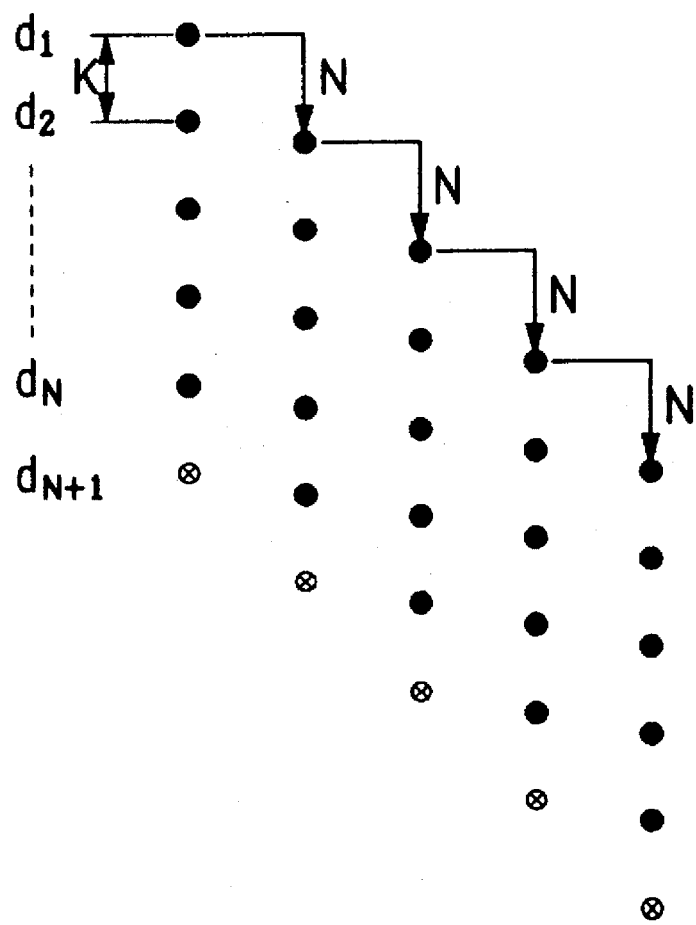
FIG. 11 is a diagram for explaining the basic operation of an interlaced print in a hybrid print mode of the second embodiment.

FIGS. 10 and 11 are diagrams for explaining the basic printing operations of the printer in two print modes (a standard print mode and a hybrid print mode).

As shown in FIG. 10, the (N+1) nozzles are equidistantly arrayed at a distance equal to K pitches in the sub-scan direction, on the print head 101. In this instance of the embodiment, K=4 and N=5 for simplicity.

In the standard print mode, the main scan is repeated K times using all the (N+1) nozzles, and a print paper is fed by a distance of one dot line pitch (this paper feed will be referred to as a minute feed) every time the main scan is carried out (the minute feed is carried out (K−1) times). As a result, {K×(N+1)} lines are printed (this printing operation will be referred to as a minute-feed print). Thereafter, the paper is fed by a distance corresponding to (K×N+1) pitches (this paper feed will be referred to as a skip feed). Then, it reaches the next print position. Print is made on the continuous area by repeating the minute-feed print and the skip feed.

In the standard print mode, if N is increased, {K×(N+1)} lines are printed by repeating the main scan K times. Accordingly, this print mode is suitable for a high speed print.

The hybrid print mode uses the minute-feed print and an interlaced print. The operation of the interlaced print will be described.

As shown in FIG. 11, N lines are printed through one main scan by using N successively arranged nozzles of (N+1)

nozzles. Then, the paper is fed by a distance corresponding to N line pitches, and reaches the next print position. Print is made on the continuous area by repeating this print operation.

Here, the nozzle-to-nozzle distance K (expressed in terms of the number of line pitches) and the number N of nozzles must satisfy the following conditions.

(Condition 1): N and K are integers that are each larger than 2 and mutually prime.

(Condition 2): N>K

In the interlaced print, only the paper feed quantity corresponding to the N line pitches is taken into consideration, for the paper feed. Thus, the paper feeds in the print area are uniform in accuracy. Further, an irregular print caused by a minute variations of the positions of the arrayed nozzles as viewed in the sub-scan direction can be reduced by printing the adjacent lines by the different nozzles. Therefore, the interlaced print is suitable for a high quality print.

Figure 12:
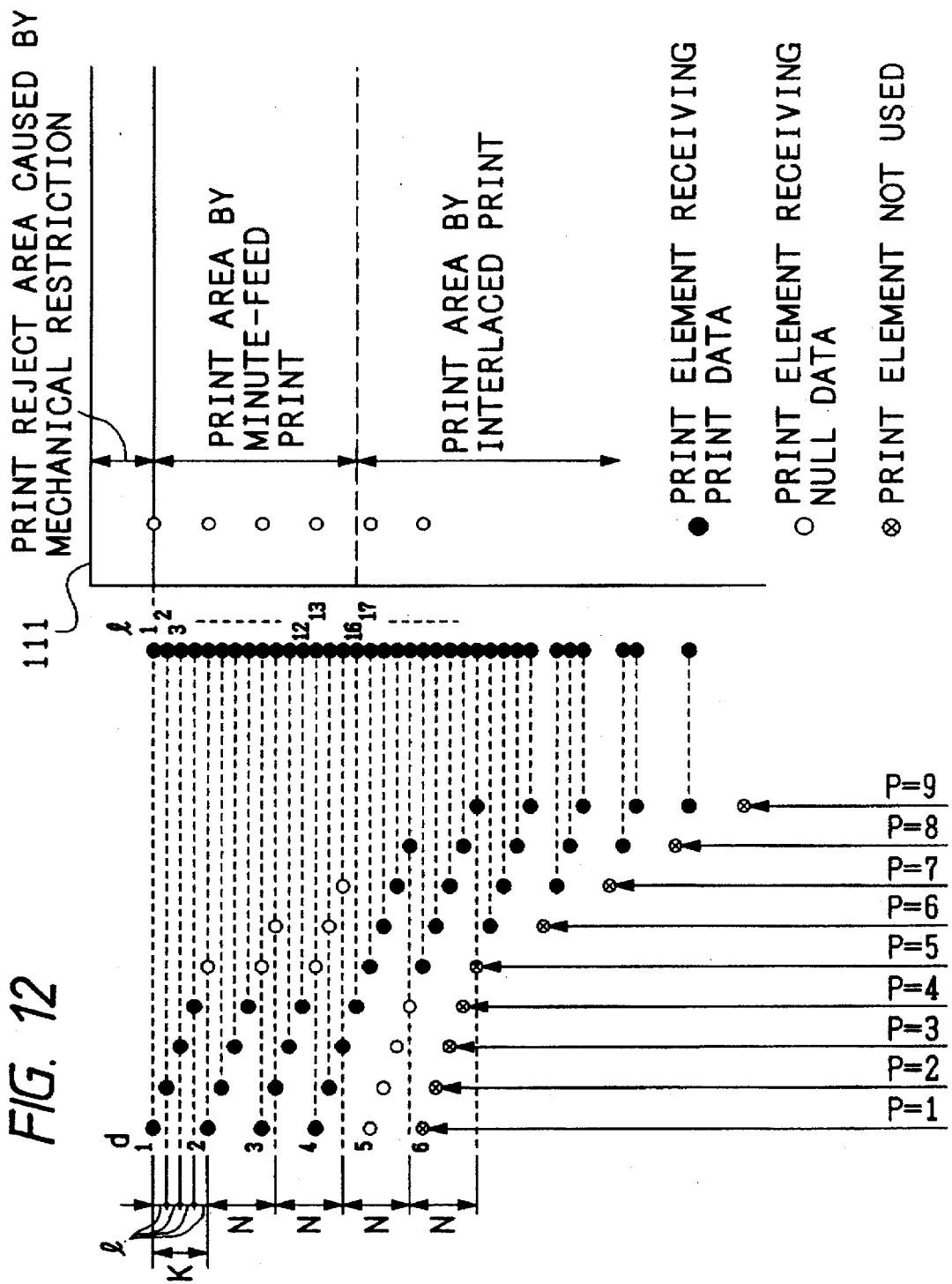
FIG. 12 is a diagram showing the operation of the printer of the second embodiment for printing lines on the upper end portion of the print area when the printer operates in the hybrid print mode.

FIG. 12 is a diagram showing an example of the way of printing lines on the upper end portion of the print area when the printer operates in the hybrid print mode.

When the print paper 111 is loaded to the printer, the nozzle d1 lies at the position of the line l1.

The standard print mode using the minute feed and the skip feed is able to print all the lines subsequent to the line l1. However, the interlaced print is unable to make a perfect print of all the lines in the area including the line l1 and a preset number of lines subsequent to the line l1. Specifically, the interlaced print is unable to make a perfect print in the area ranging from the line l1 to line l{(N−1)×(K−1)}. As will be described later, the trailing end portion of the print paper 111 also includes a print reject area. The print reject areas in the leading end portion and the trailing end portion of the print paper 111 will be referred to as a "head area" and a "foot area". An area of the print paper 111, which is located between the head area and the foot area and accepts a perfect print by the interlaced print, will be referred to as a "body area".

To obtain a perfect print in the head area, the hybrid print mode uses the minute-feed print and the interlaced print. The interlaced print is unable to print lines in the area between the line l1 and line l{(N−1)×(K−1)}, as described above. However, the minute-feed print is able to print lines in this area. Hence, the minute-feed print is complementarily used for the print in this head area, to thereby secure a perfect print.

The nozzles are arrayed at the intervals of K line pitches. To make a density print in this interval by the minute-feed print, at least K main scans are required. At the end of the K minute feeds and the main scans, the nozzle d1 is placed at the position of the line l(K+1). At this position, the interlaced print starts. In the interlaced print starting at the line l(K+1), an area which rejects the successive print is between line l(K+1) to line l{N×(K−1)+1}. For the print in this area between line l(K+1) to line l{N×(K−1)+1}, the minute-feed print is used.

FIG. 12 shows a print procedure when K=4 and N=5.

Since the area to which the K minute-feed prints are to be applied must be between line l1 and line l16, the nozzles used for the main scans p=1 to 4 are the nozzles d1 to d4. NULL data is applied to the nozzle d5 located subsequent to the line l16, and the nozzle d6 is not used.

Following the density print for the head area of the lines l1 to l16 by the K minute-feed prints and the main scans (p=1 to 4), the interlaced print based on the N line pitches is performed. NULL data is applied to the nozzles positioned at the lines l1 to l16 on which the print has already been carried out. Accordingly, the nozzles contributing to the print in the subsequent main scans p=5 to 7 are: nozzles d4 to d5 for the main scan p=5, nozzles d3 to d5 for the main scan p=6, and nozzles d2 to d5 for the main scan p=7. In the subsequent main scans (p=8 and the subsequent ones), all the nozzles are moved to a not-yet-printed area extended from the line l17. Accordingly, the print is carried out using all the upper five (=N) nozzles d1 to d5.

In this way, the lines l1 to l16 are printed by the minute-feed print, and the line l17 and the subsequent ones in the body area are densely printed by the interlaced print.

With regard to the paper feed operation, only the minute feed is used for printing the lines l1 to l16 in the head area, while only the paper feed of the N line pitches is used for printing the line l17 and the subsequent ones in the body area. Accordingly, the accuracy of the paper feed in the sub-scan direction is uniformly dispersed in the respective areas. A difference of accuracy between the minute feed and the N line pitch feed is present only between the line l16 and the line l7. This accuracy difference is smaller than the accuracy difference between the minute feed and the skip feed (sub-scan of (K×N+1) line pitchs) in the conventional standard print. Accordingly, the accuracy difference affects a smaller influence on the print quality than that in the conventional print.

The minute-feed print in the hybrid print mode is required only when print data is present for the head area of the lines l1 to l{(N−1)×(K−1)}. When print data is present for the body area of the line l{(N−1)×(K−1)+1} and the subsequent ones, but no print data is present for the head area of the lines l1 to l{(N−1)×(K−1)}, the successive print can be made by using only the interlaced print starting from the line l1. For this reason, for the print, it is desirable to previously detect the start position of the print data, and to select "to use the minute feed before the interlaced print" or "to use the interlaced print from the first line".

The printing operation for the lower end portion of the print area will be described.

Figure 13:
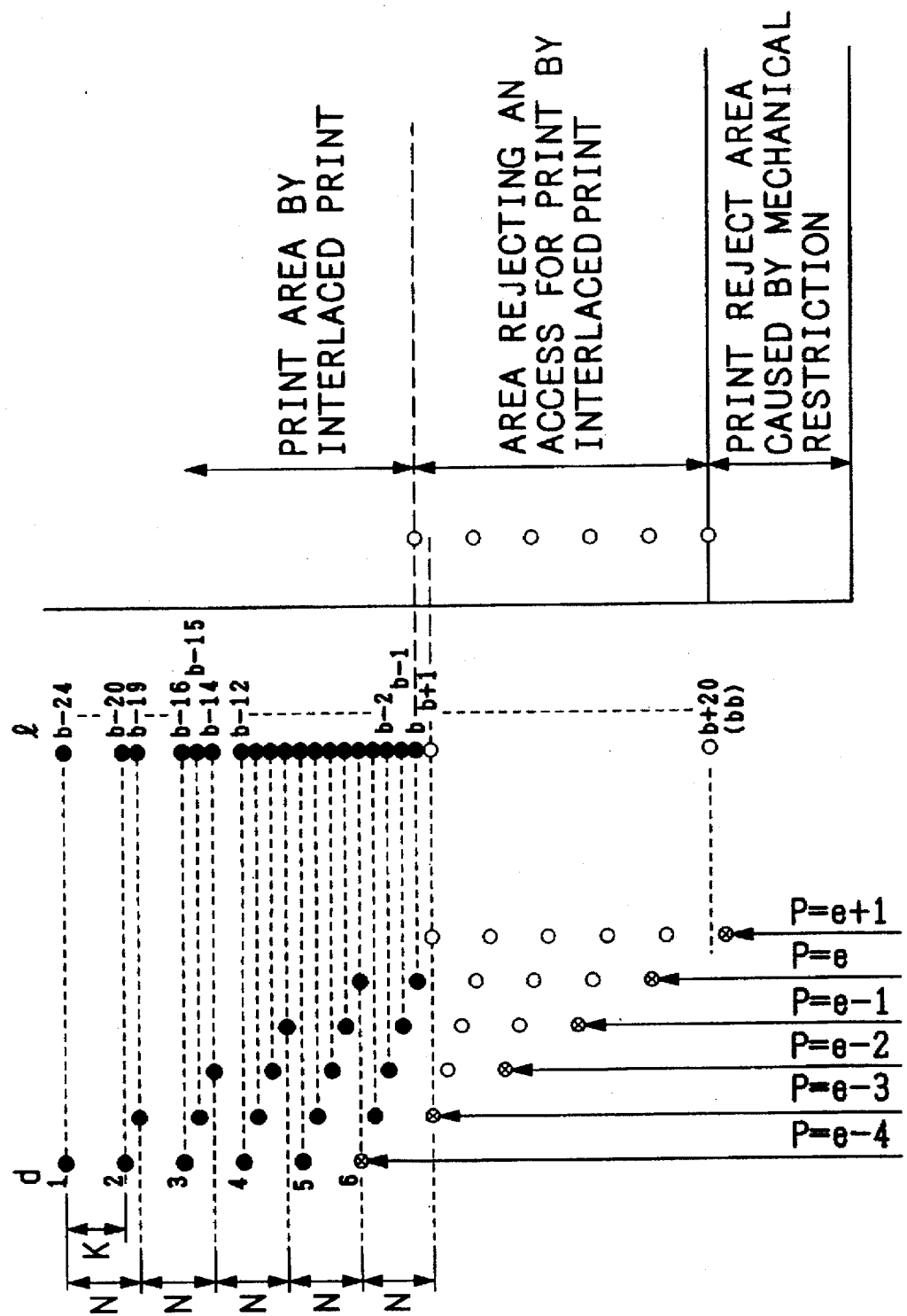
FIG. 13 is a diagram showing the printing operation of the printer for a print reject area in the trailing end portion of the print medium when it operates in a conventional interlaced print mode.

FIG. 13 diagrammatically shows the printing operation of the printer in a case where the area rejecting an access for print by the interlaced print in the lower end portion of the print area is the largest when the interlaced print is performed.

Because of the mechanical restrictions, the position the print head 101 finally reaches is the line lbb. It is assumed that the mechanical restrictions disables the print head 101 to set the last nozzle d5 used by the interlaced print to the position of the last line lbb by the difference of one line, although the interlaced print is to be performed till the last main scan p=e+1. In a case where the last line of the print acceptable area in the interlaced print is the line lb, the foot area ranging from l(b+1) to lbb, or of N×K lines, rejects a perfect print by the interlaced print.

Figure 14:
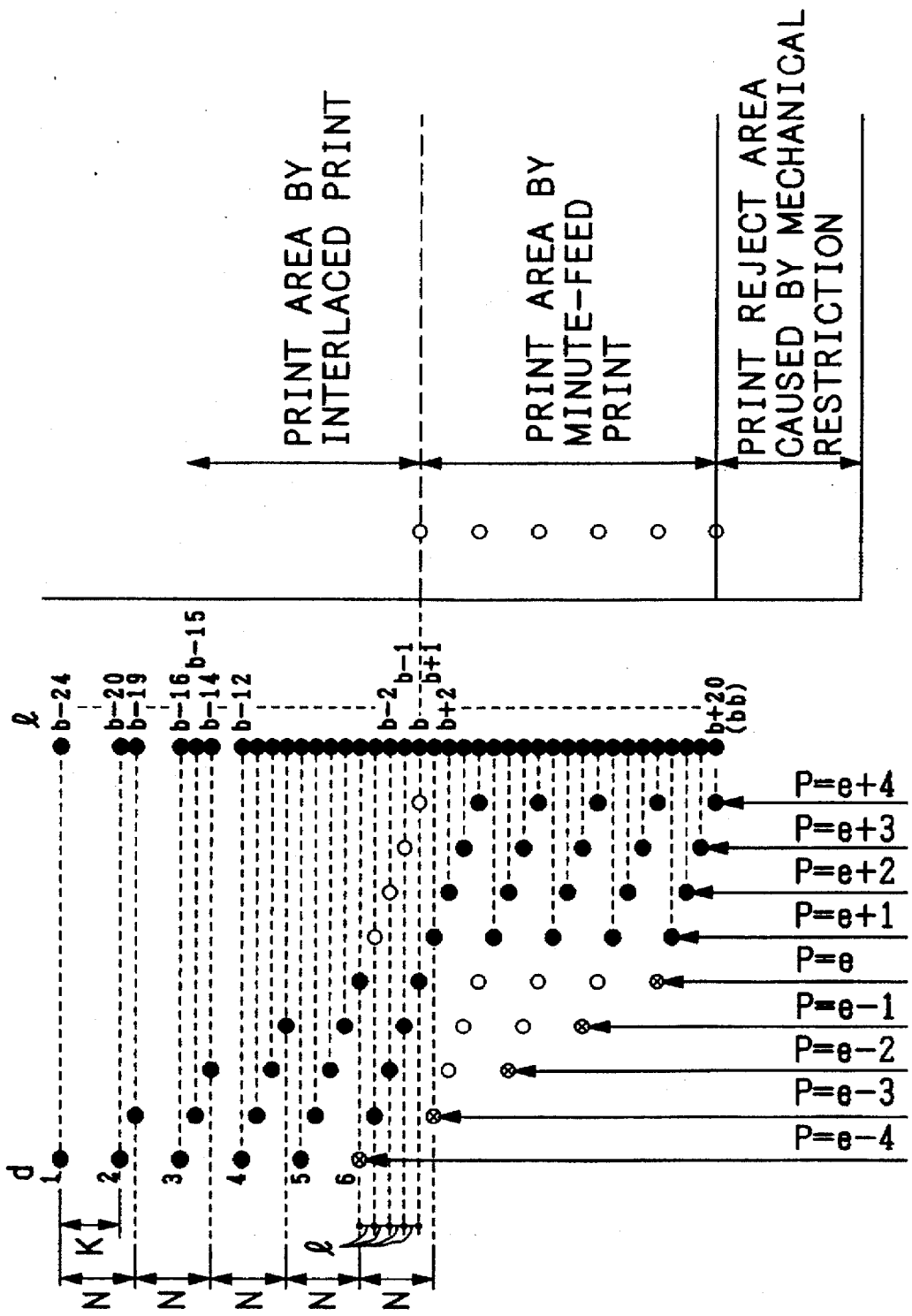
FIG. 14 is a diagram showing the operation of the printer of the second embodiment for printing lines on the lower end portion of the print area when it operates in the hybrid print mode.

FIG. 14 is a diagram showing the operation of the printer for printing lines in the foot area by the minute-feed print when it operates in the hybrid print mode.

The interlaced print is continued till the main scan p=e. In the interlaced print (the scans up to the scan p=e), only the nozzles for the body area including lines preceding to the line lb are used for the print, but the nozzles for the foot area including the line l(b+1) and the subsequent ones are not used by applying NULL data to the nozzles. Of the (N+1) nozzles, the N upper nozzles are used for the interlaced print as shown in FIG. 11.

When the main scan p=e ends, the minute-feed print starts for the print for the foot area including the line l(b+1) and the subsequent ones. After the main scan p=e ends, the nozzle d1 is moved to the position of the line l(b−K+1) by the minute feed. If the nozzle used by the minute-feed print is made coincident with the nozzle by the interlaced print as in the printing operation shown in FIG. 12, the last K lines including the last line 1bb in the print area cannot be printed.

In the minute-feed print after the main scan p=e+1, the (N+1)th nozzle which has not been used in the hybrid print mode is also used. A NULL signal is applied to the nozzles located for the area including the already printed lines preceding to the line lb. Only the nozzles located in the foot area including the line l(b+1)–1bb, or N×K lines, are used for the print. As a result, N×K lines are densely printed by repeating the minute-feed print at least K times.

FIG. 14 shows a print procedure in a case where K=4 and N=5.

The interlaced print is continued till the main scan p=e. In this case, the foot area consists of 20 lines of the lines l(b+1) to 1bb (=l(b+20)). Accordingly, in the main scans p=e−2, e−1, and e, NULL data is applied to the nozzles d5, d4 to d5, and d3 to d5, respectively. The nozzle d6 is not used. Through the interlaced printing operation till the main scan p=e, the lines preceding to the line lb are all printed densely.

After the main scan p=e ends, the nozzle d1 is moved to the position of the line l(b−3) by the minute feed, and the nozzle d2 is moved to the position of the line l(b+1), and then the minute-feed print starts.

Since the lines preceding to the line lb have all been printed in the minute-feed print, NULL data is applied to the nozzles located for the area including the lines preceding to the line lb. Since the area including the line l(b+1) and the subsequent ones is not subjected to the print, the minute-feed print is applied for print to this area by using the nozzles d2 to d6. The 20 llines of the lines l(b+1) to 1bb in the foot area are densely printed by the nozzles d2 to d6, through the K main scans subsequent to the main scan p=e+1.

As a result, the 20 lines of the line l(b+1) to the last line 1bb form a successive print area by the minute-feed print. The lines preceding to the line lb form a successive area by the interlaced print.

With regard to the paper feed operation, only the minute feed of one line pitch is used for printing the lines l(b+1) to 1bb in the foot area, while only the paper feed of the N line pitches is used for printing the lines preceding to the line lb in the body area. Accordingly, the accuracy of the paper feed in the sub-scan direction is uniformly dispersed in the respective areas. A difference of accuracy between the minute feed and the N line pitch feed is present only between the line lb and the line l(b+1). This accuracy difference is smaller than the accuracy difference between the minute feed and skip feed (the paper feed of (K×N+1) line pitchs) in the conventional print by the minute feed+skip feed. Accordingly, the accuracy difference affects a smaller influence on the print quality than that in the conventional print.

The minute-feed print is required only when print data is present for the area of the N×K last line pitches of the lines l(b+1) to 1bb. When print data is used up before the line lb, and no print data is present for the foot area of the N×K last lines (pitch) of the line l(b+1) to 1bb, the successive print can be made by using only the interlaced print. For this reason, for the print, it is desirable to select "to use the minute feed after the interlaced print" or "to use the interlaced print till the last line", depending on the final position of the print data.

Figure 15:
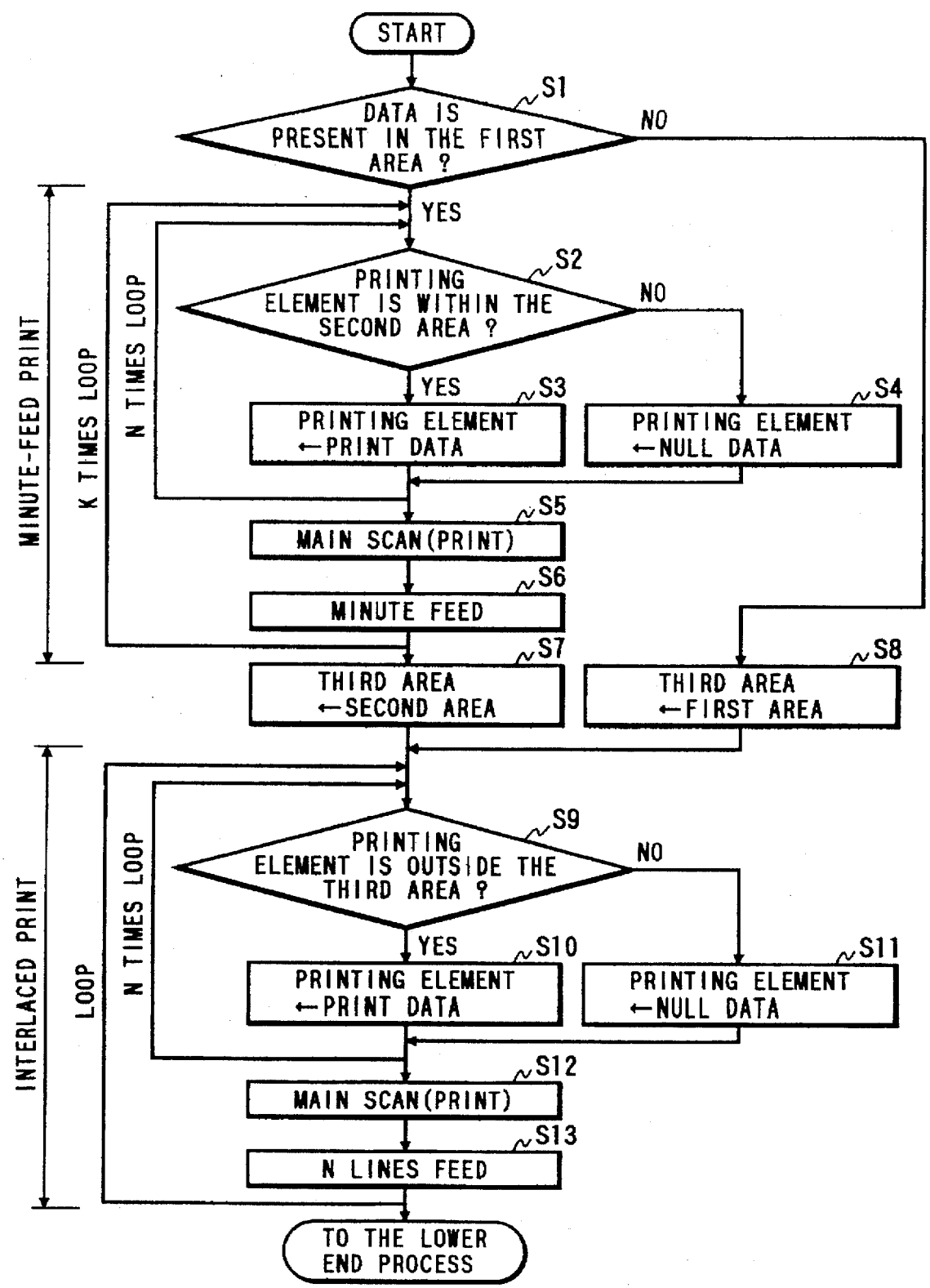
FIG. 15 is a flowchart showing a data processing procedure when the printer of the second embodiment operates in a hybrid print mode for printing lines on the lower end portion of a print area.
Figure 16:
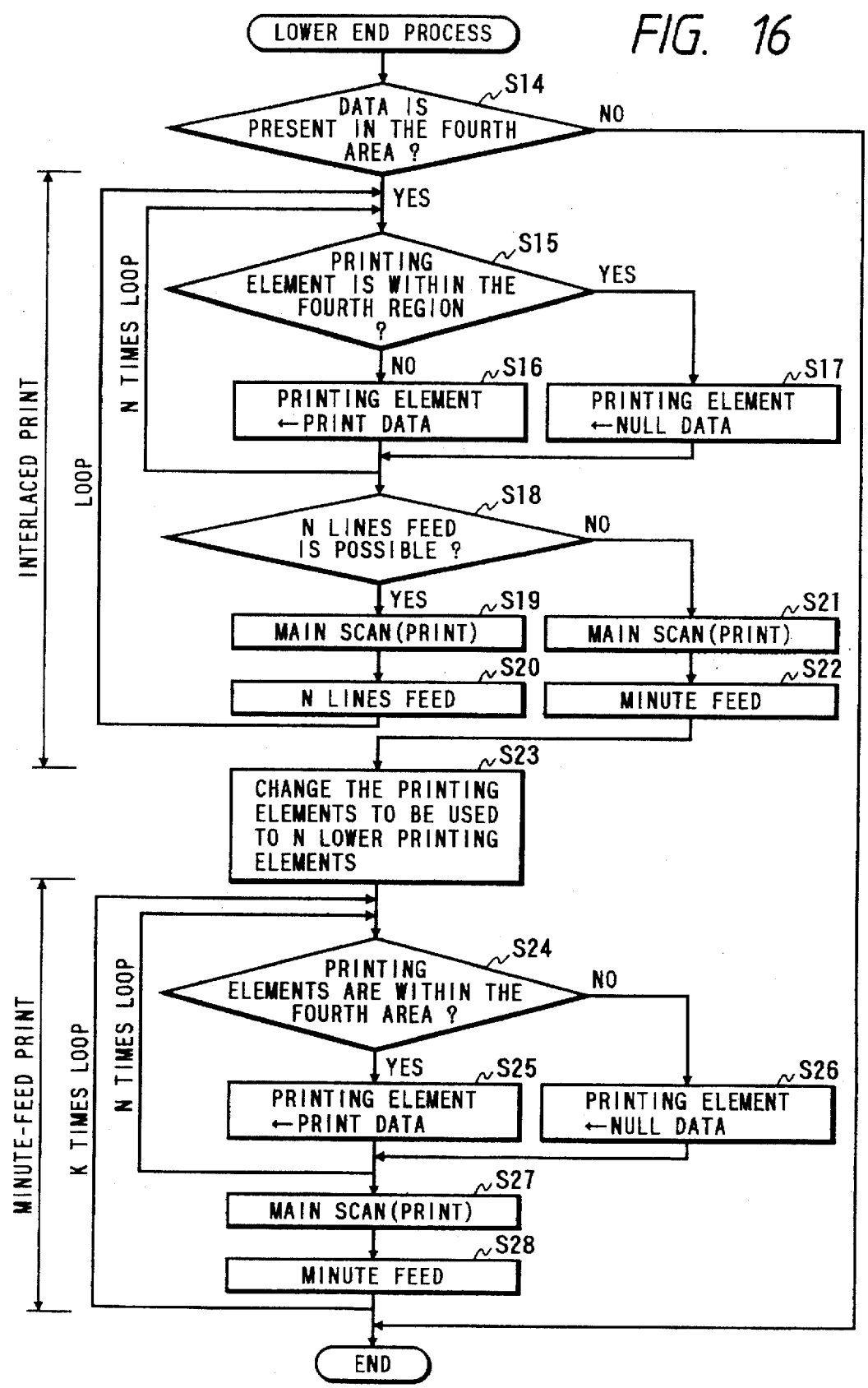
FIG. 16 is a flowchart showing another data processing procedure when the printer of the second embodiment operates in the hybrid print mode for printing lines on the lower end portion of a print area.

FIGS. 15 and 16 are flowcharts showing a flow of the control for the hybrid print mode, carried out by a controller of a microcomputer contained in the printer.

The process of the print for the upper end portion of a print paper shown in FIG. 12 will be described with reference to FIG. 15.

The controller checks whether or not print data for the area of the lines 11 to 1{(N−1)×(K−1)} (this area is set as a first area) is present (step S1). If the print data is present, the minute-feed print starts.

The controller checks whether or not the N upper nozzles are within the area of the lines 11 to 1{(N×(K−1)+1}(this area is set as a second area) (step S2). Print data is applied to the nozzles located within the second area, and NULL data is applied to the nozzles outside the second area (step S4). The main scan is performed for print (step S5), and the minute feed is carried out (step S6). This minute-feed print is repeated K times.

After the minute-feed print is repeated K times, in order to transfer to the interlaced print, the contents (lines 11 to 1{N×(K−1)+1}) of the second area are also set as a third area (step S7).

If the check result of the step S1 shows that no print data is present in the first area, the contents (lines 11 to 1{(N−1)−(K−1)}) of the first area are also set as the third area (step S8).

After the step S7 or S8 is executed, the controller checks whether or not the N nozzles are located outside the third area (step S9). Print data is applied to the nozzles located outside the third area (step S10). NULL data is applied to the nozzles located within the third area (step S11). The main scan is performed for print (step S12), and then the sub-scan is performed for the N lines (step S13). The interlaced printing operation as mentioned above is repeated till the print position for the print medium reaches a position where the following lower end portion processing is required.

A process of the printing operation for the lower end portion of the print medium shown in FIG. 14 will be described with reference to FIG. 16.

When the print position for the print medium reaches a position near the lower end of the print medium, this lower end process starts. The controller checks if the print data is present within the area of the lines l(b+1) to 1bb (=l(b+N×K)) (this area is set as a fourth area) (step S14). If the print data is present, the controller checks if the N upper nozzles are located within the fourth area (step S15). Controller applies print data to the nozzles within the fourth area (step S16), but applies NULL data to the nozzles not within the fourth area (step S17). Then, the controller checks if the sub-scan of N lines is possible (step S18). If it is possible, the printing operation by the main scan and the sub-scan of N lines following the former are performed (steps S19 and S20). The interlaced printing operation as mentioned above is repeated till the check result of the step S18 shows that the sub-scan of N lines is impossible.

If the check result of the step S18 shows that the sub-scan of N lines is impossible, the print by the main scan and the subsequent minute feed of one line are performed (steps S21 and S22), and then the minute feed operation starts.

In shifting the print mode to the minute feed, the N upper nozzles are changed to the N lower nozzles (step S23). In this case, all the (N+1) nozzles may be used in place of the N upper nozzles.

The controller checks if the nozzles to be used are within the fourth area (step S24), applies print data to the nozzles located therewithin (step S25), and applies NULL data to the nozzles not located therewithin (step S26). The print is made by the main scan (step S27), and the minute feed is carried out (step S28). After the minute-feed print is repeated K times, the printing operation for the print medium ends.

If no print data is present in the step S14, the interlaced printing operation of FIG. 15 is continued till the last data, and the printing operation for the print medium ends.

A third embodiment of the present invention will be described.

Figure 17:
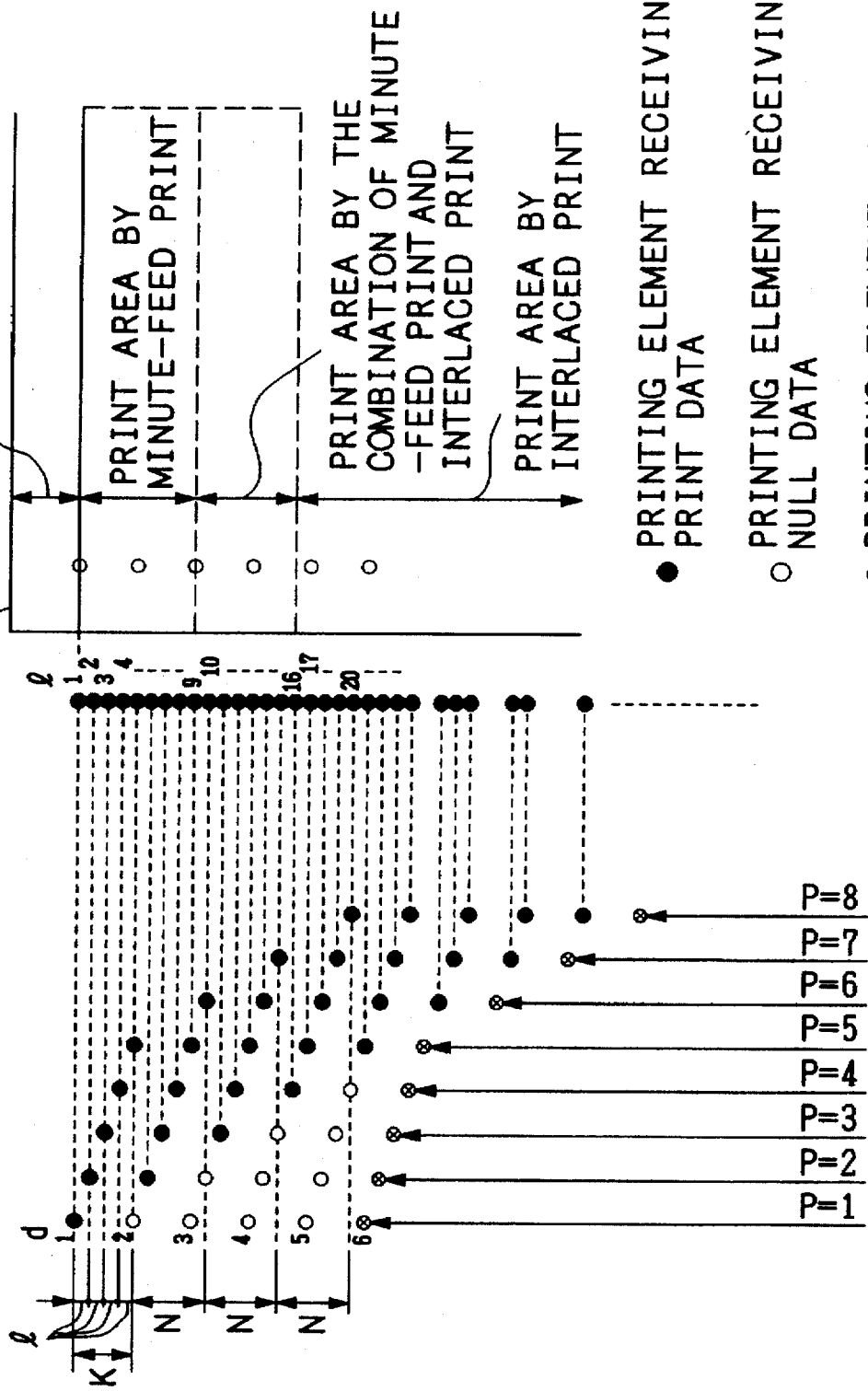
FIG. 17 is a diagram showing the operation of the printer of the third embodiment for printing lines on the upper end portion of the print area when the printer operates in the hybrid print mode.

This embodiment is different from the above-mentioned second embodiment in the operation of the hybrid print mode. FIG. 17 is a diagram showing the printing operation for the upper end portion of a print medium in the hybrid print mode of this embodiment.

In the second embodiment mentioned above, as shown in FIG. 12, the head area is first subjected to the minute-feed print. In this third embodiment of FIG. 17, the lines that can be printed by the interlaced print, even if these are within the head area, are all printed by the interlaced print. The minute-feed print is applied for print to only the remaining lines, for print. Thus, it is safe to say that this embodiment is characterized in that the range within which the interlaced print is used, is enlarged to the maximum. As a result, the printer of this embodiment enjoys the merit to the maximum that the high print quality (good dot alignment) is obtained by the interlaced print.

The printing operation for the upper end portion of the print medium will be described with reference to FIG. 17.

The minute feed print is first performed. When the minute-feed print is repeated K times, the nozzle d1 moves to reach the position of the line l(K+1). The interlaced print starts from this position. At this time, the positions of the nozzles d1 to d4 are the same as the positions of the nozzles d2 to d5 in the scan p1 of the minute-feed print, respectively. Among the lines printed by the minute-feed print (main scan p=1 to 4) in the above-mentioned embodiment (FIG. 12), those lines that can be printed by the interlaced print (main scan p=5 and the subsequent ones) using the nozzles d1 to d5 are all printed by the interlaced print. In the minute-feed print performed prior to the interlaced print, NULL data is applied to the nozzles corresponding to the lines that can be printed by the interlaced print.

As a result, an area that accepts only the minute-feed print contains the lines l1 to l9, an area that accepts the combination of the minute-feed print and the interlaced print contains the lines l10 to l16, and an area that accepts only the interlaced print contains the line l17 and the subsequent ones.

In the area that accepts the combination of the minute-feed print and the interlaced print and the area that accepts only the interlaced print, an irregular print (i.e., deterioration of the dot alignment) caused by a minute variation of the positions of those arrayed nozzles d1 to d5 as viewed in the sub-scan direction is reduced as the result of using the interlaced print. The area that accepts only the minute-feed print is the area containing the lines l1 to l9. This area is small, viz., consists of (2×K+1) lines. The influence of this area upon the whole print quality is small.

The printing operation for the lower end portion of the print medium will be described with reference to FIG. 18. Also in the foot area, the lines that can be printed by the interlaced print are all printed by the interlaced print. Only the remaining lines are printed by the minute-feed print.

In the main scans p=e−2, e−1−, and e by the interlaced print, the nozzles d5, d4 to d5, and d3 to d5 are located within the area that rejects the interlaced print. By positively using the nozzles within the interlaced-print reject area, some of the lines in the interlaced-print reject area are printed through the main scans p=e−2, e−1, and e by the interlaced print before the minute-feed print that follows the interlaced print is performed.

During the main scans p=e+1 to e+4 that follows the interlaced print, NULL data is applied to the nozzles corresponding to the lines already printed by the interlaced print.

As a result, the area accepting only the interlaced print contains the lines located preceding to the line lb, the area accepting the combination of the interlaced print and the minute-feed print contains the lines l(b+1) to l(b+11), and the area accepting only the minute-feed print contains the lines l(b+2) to lbb.

In the area accepting the combination of the interlaced print and the minute-feed print, and the area accepting only the interlaced print, use of the interlaced print lessens the deterioration of the dot alignment. The area that accepts only the minute-feed print is small, viz., consists of (2×K+1) lines from l(b+12) to lbb. The influence of this area upon the whole print quality is small.

Figure 18:
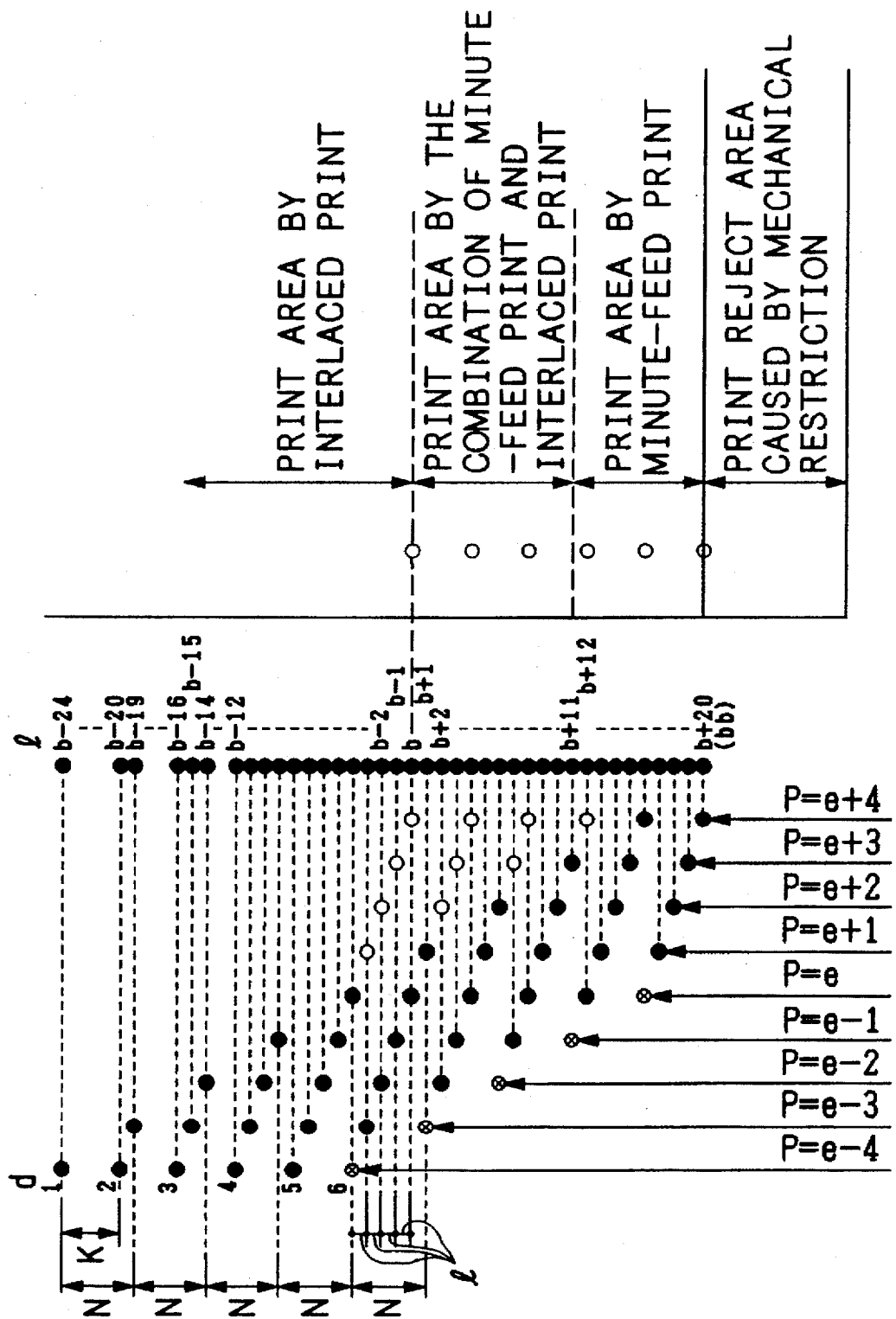
FIG. 18 is a diagram showing the operation of the printer of the third embodiment for printing lines on the lower end portion of the print area when the printer operates in the hybrid print mode.
Figure 19:
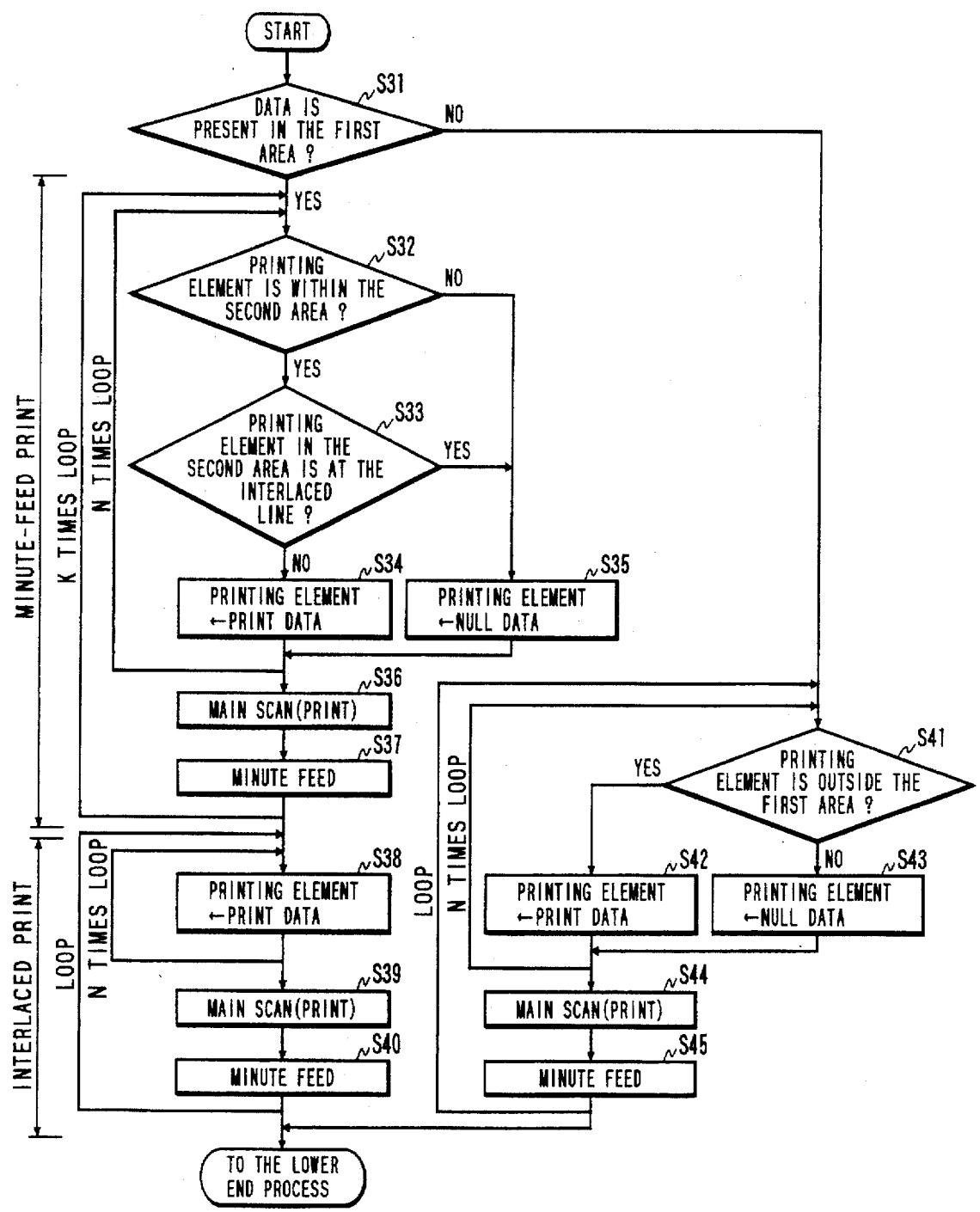
FIG. 19 is a flowchart showing a data processing procedure when the printer of the third embodiment operates in a hybrid print mode for printing lines on the upper end portion of a print area.
Figure 20:
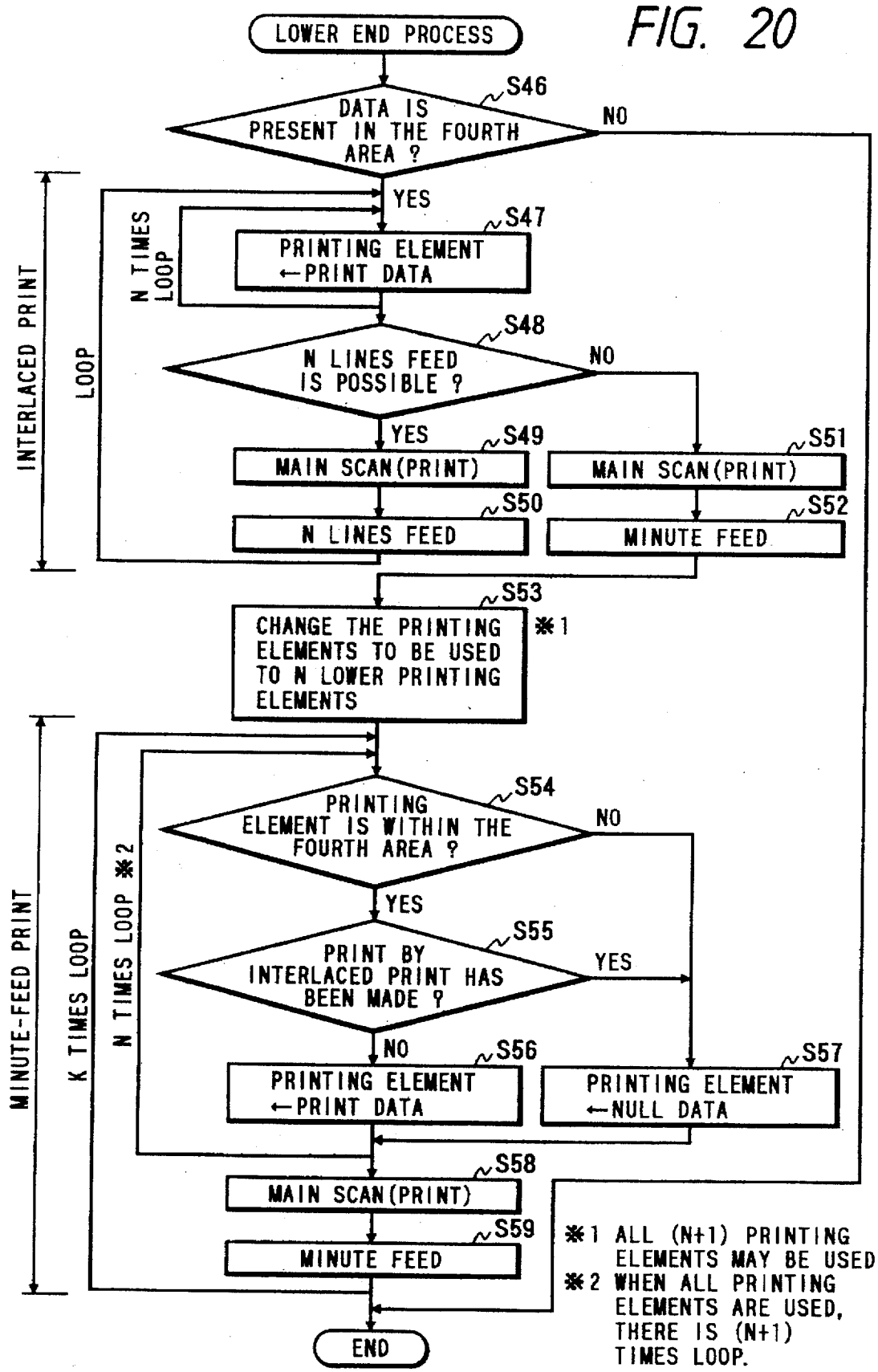
FIG. 20 is a flowchart showing a data processing procedure when the printer of the third embodiment operates in a hybrid print mode for printing lines on the lower end portion of a print area.

FIGS. 19 and 20 are flowcharts showing flows of information processes executed by a controller of a microcomputer, for the printing operations shown in FIGS. 17 and 18.

The information process for the printing operation for the upper end portion of a print medium shown in FIG. 17, will first be described with reference to FIG. 19.

The controller checks whether or not print data for an area containing the lines l1 to l{(N−1)×(K−1)} (this area is set as a first area) is present (step S31). If the print data is present, the controller executes the minute-feed print.

The controller checks whether or not the N number of the upper nozzles are located within an area containing the lines l1 to l{N×(K−1)+1} (this area is set as a second area) (step S32). The controller further checks whether or not the nozzles in the second area are located at the positions of the lines that can be printed by a preset interlaced print (these lines will be referred to as interlaced lines) (step S33). On the basis of the check results, the controller applies print data to the nozzles, which are located within the second area and not located at the positions of the interlaced lines (step S34). The controller also applies NULL data to the remaining nozzles (step S35). The main scan is carried out to print (step S36), and then the minute feed is carried out (step S37). The minute-feed print is repeated K times.

Thereafter, the interlaced printing operation is performed. In the interlaced print, print data is applied to the N upper nozzles (step S38), the main scan is carried out to print (step S39), and then the sub-scan of the N lines are carried out (step S40).

If the check result of the step S31 shows that no print data is present in the first area, the controller directly executes a process of the interlaced print. In the interlaced print process, the controller checks if the N upper nozzles are located outside the first area (step S41), applies print data to the nozzles outside the first area (step S42), and applies NULL data to the nozzles within the first area (step S43). Then, the main scan is carried out to print (step S44), and the sub-scan of the N lines are carried out (step S45). The interlaced printing operation as mentioned above is repeated till the print position for the print medium reaches a start position of a given lower end process.

The lower end process for the printing operation for the lower end portion of the print medium shown in FIG. 18, will be described with reference to FIG. 20.

This lower end process starts when the print position reaches the start position of the lower end process. In this process, the controller checks if print data is present in an area containing the lines l(b+1) to lbb (=l(b+N×K)) (this area is set as a fourth area) (step S46). If the check result shows that the print data is present, the controller applies print data to the N upper nozzles (step S47). Then, the controller checks whether or not the sub-scan of the N lines are possible (step S48). If possible, the printing operation by the main scan and then the sub-scan of the N lines are carried out (steps S49 and S50). The interlaced printing operation is repeated till the check result of the step S48 shows that the sub-scan is impossible.

If the answer to the step S48 is "impossible", the printing operation by the main scan and the minute feed of one line are carried out (steps S51 and S52), and then the minute feed is carried out.

To shift to the minute feed, the nozzles to be used are changed from the N upper nozzles to the N lower nozzles (step S53). In this case, (N+1) nozzles are all used in place of the N lower nozzles.

The controller checks if the nozzles used are within the fourth area (step S54), and checks if those nozzles within the fourth area are at the positions of the already printed lines (predetermined interlaced lines) by the previous interlaced print (step S55). Print data is applied to the nozzles which are located within the fourth area and not at the positions of the interlaced lines (step S56). NULL data is applied to the remaining nozzles (step S57). The printing operation by the main scan is performed (step S58), and then the minute feed is performed (step S59). After the minute-feed print is repeated K times, the printing operation for the print medium ends.

If the check result of the step S46 shows that no print data in the fourth area is present, the interlaced printing operation of FIG. 19 is continued till the final data is used up, and the printing operation for the print medium ends.

As described above, in this embodiment, the print area in the standard print mode based on the conventional standard print is coincident with the print area in the hybrid print mode, formed by combining the minute feed and the interlaced print according to the present invention. Therefore, the problem caused if both the print areas are not coincident with each other, is successfully solved.

In the hybrid print mode, when print data for the interlaced print reject area is absent, the print is carried out using only the interlaced print without using the minute-feed print. Accordingly, the printer of this embodiment operates at higher print speed than a printer in which the minute-feed print is constantly used in any situation.

Additionally, when it is considered that the standard print mode is a high speed print mode and the hybrid print mode is a high quality print mode, the embodiment could remove the reduction of the print area which is observed in the conventional high quality print mode using only the interlaced print.

In the printer in which a desired resolution may be selected from among a plural number of different print resolutions, the nozzle-to-nozzle distance K (lines) is changed according to the selected resolution. In this type of the printer, it is a common practice that the selected resolutions is integer times as large as the basic resolution K. Therefore, if for K'=s×K (s: an integer larger than 2) set up for a new resolution, the number N of nozzles is selected so as to satisfy the conditions 1 and 2 already described, a plural number of resolutions may be selected using one print head 101.

While some preferred embodiments of the present invention have been described, it is easily understood to those skilled persons in the art that the present invention may be embodied in various other modes than the above-mentioned one. For example, it is evident that the present invention may be applied to not only the ink jet printer but also other types of serial printers, such as thermal printers, and dot impact printers.

What is claimed is:

1. A serial printer for carrying out a print on a print medium by alternately carrying out a main scan and a sub-scan by a print head above said print medium, comprising:

(N+1) dot forming elements mounted in said print head and arrayed in a direction of the sub-scan, a distance between adjacent ones of said dot forming elements being K times as long as a dot line pitch, N and K being mutually prime and each an integer larger than 2, and N>K;

a hybrid print control means for controlling the main scan, the sub-scan, and operation of said dot forming elements, so as to selectively carry out one of a minute-feed print and an interlaced print, said hybrid print control means carrying out the interlaced print for a body area of said print medium which accepts a perfect print by the interlaced print, and a second selection means for selecting the minute-feed print for a head area and a foot area of said print medium which reject a perfect print by the interlaced print.

2. The serial printer according to claim 1, wherein when the minute-feed print is carried out to print the head area, and the interlaced print is carried out to print the body area, said hybrid print control means enables N successive dot forming elements of said (N+1) dot forming elements.

3. The serial printer according to claim 2, wherein when the minute-feed print is carried out to print the head area, and the interlaced print is carried out to print the body area, said hybrid print control means enables N successive upper dot forming elements of said (N+1) dot forming elements, and when the minute-feed print is carried out to print the foot area, said hybrid print control means enables at least N successive lower dot forming elements of said (N+1) dot forming elements.

4. The serial printer according to claim 1, further comprising a standard print control means for controlling the main scan, the sub-scan, and operation of the dot forming elements, so as to selectively carry out one of a step feed print and the minute-feed print, wherein a position of an upper print end of the print medium is controlled by said hybrid control means and by said standard print control means, and wherein the position of an upper print end controlled by said hybrid print control means is coincident with the position of an upper print end controlled by said standard print control means.

5. The serial printer according to claim 1, wherein said hybrid print control means comprises a first means for detecting whether or not print data is present in the head area and the foot area of said print medium, and a second means for omitting the minute-feed print in the area having no print data when said first means detects that no print data is present in at least one of the head area and the foot area.

6. The serial printer according to claim 1, wherein said hybrid print control means includes a first means for printing all lines in the head area and the foot area by the minute-feed print, and a second means for printing all lines within the body area by the interlaced print.

7. The serial printer according to claim 1, wherein said hybrid print control means includes a first means for printing, by the interlaced print, not only all lines in the body area but also lines in the head area and the foot area that can be printed by the interlaced print, and a second means for printing only lines in the head area and the foot area that cannot be printed by the interlaced print, by the minute-feed print.

8. The serial printer according to claims 6 or 7, further comprising a third means for generating NULL data to some of said dot forming elements located at lines that can be printed by both the minute-feed print and the interlaced print when one of the minute-feed print and the interlaced print is carried out.

9. The serial printer according to claim 8, wherein said third means generates the NULL data only when the minute-feed print is carried out.

10. The serial printer according to claim 1, wherein said dot forming elements are arranged so as to form dots on said print medium, each of the dots having a diameter at least 1.4 times as long as the dot line pitch.

11. The serial printer according to claim 1, wherein a print density of the printer is at least about 720 dpi.

* * * * *